(12) United States Patent
Haneda et al.

(10) Patent No.: US 11,301,992 B2
(45) Date of Patent: Apr. 12, 2022

(54) INFORMATION PROCESSING DEVICE, WATER-SUPPLY SYSTEM, INFORMATION PROCESSING SYSTEM AND NON-TRANSITORY COMPUTER READABLE MEDIUM STORING PROGRAM

(71) Applicant: HONDA MOTOR CO., LTD., Tokyo (JP)

(72) Inventors: Satoshi Haneda, Saitama (JP); Takamasa Udagawa, Saitama (JP); Makoto Yamamura, Saitama (JP); Masato Fujiwara, Saitama (JP); Ryuichi Kimata, Tokyo (JP); Satoshi Onodera, Tokyo (JP); Yutaka Tsuji, Tokyo (JP); Hiroyuki Isegawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 302 days.

(21) Appl. No.: 16/455,752

(22) Filed: Jun. 28, 2019

(65) Prior Publication Data
US 2019/0333214 A1    Oct. 31, 2019

Related U.S. Application Data

(63) Continuation of application No. PCT/JP2017/045001, filed on Dec. 14, 2017.

(30) Foreign Application Priority Data

Dec. 28, 2016    (JP) .............................. JP2016-257003

(51) Int. Cl.
*G06T 7/00*    (2017.01)
*G06K 9/00*    (2006.01)
*A01D 34/00*    (2006.01)

(52) U.S. Cl.
CPC .......... *G06T 7/0012* (2013.01); *A01D 34/001* (2013.01); *A01D 34/008* (2013.01); *G06K 9/00496* (2013.01); *G06T 2207/30188* (2013.01)

(58) Field of Classification Search
USPC .................................................. 382/100, 110
See application file for complete search history.

(56) References Cited

U.S. PATENT DOCUMENTS 8,028,470 B2 * 10/2011 Anderson ............ A01G 25/167
47/48.5
8,322,072 B2 * 12/2012 Anderson ............ A01G 25/167
47/48.5

(Continued)

FOREIGN PATENT DOCUMENTS

| CN | 102564593 A | 7/2012 |
| GN | 101869047 A | 10/2010 |

(Continued)

OTHER PUBLICATIONS

Office Action issued for counterpart Japanese Application No. 2016-257003, drafted by the Japan Patent Office dated Sep. 10, 2019.

(Continued)

*Primary Examiner* — Ishrat I Sherali

(57) ABSTRACT

An information processing device includes: an image acquiring section that acquires image data of an image of a plant; a form recognizing section that recognizes at least either (i) a shape of the plant or (ii) an end portion of the plant, based on the image data acquired by the image acquiring section; and a deciding section that decides at least one of (a) a level of water content in a medium of the plant, (b) whether water-supply to the plant is necessary or not, and (c) an amount of water-supply to the plant, based on a (Continued)

feature of at least either the shape of the plant or the end portion of the plant that is recognized by the form recognizing section.

17 Claims, 14 Drawing Sheets

(56) References Cited

U.S. PATENT DOCUMENTS

| | | | |
|---|---|---|---|
| 9,265,204 B2* | 2/2016 | Younis | A01G 25/165 |
| 9,658,201 B2* | 5/2017 | Redden | G01B 11/24 |
| 10,192,185 B2 | 1/2019 | Tomii | |
| 10,552,951 B2* | 2/2020 | Barrasso | H05B 45/20 |
| 10,864,891 B2* | 12/2020 | Haneda | G05D 1/0246 |
| 11,002,670 B2* | 5/2021 | Fujiyama | A01G 25/165 |
| 2010/0268390 A1 | 10/2010 | Anderson | |
| 2013/0184924 A1* | 7/2013 | Jagenstedt | B60L 15/20 |
| | | | 701/23 |
| 2015/0163993 A1* | 6/2015 | Pettersson | A01D 34/008 |
| | | | 701/28 |
| 2016/0278287 A1 | 9/2016 | Kasai | |
| 2016/0371830 A1 | 12/2016 | Barrasso | |
| 2017/0118925 A1* | 5/2017 | Noguchi | G01J 3/0264 |
| 2018/0035606 A1* | 2/2018 | Burdoucci | A01D 34/84 |
| 2019/0313576 A1* | 10/2019 | Haneda | G05D 1/0088 |
| 2019/0315314 A1* | 10/2019 | Haneda | B60R 25/305 |

FOREIGN PATENT DOCUMENTS

| | | |
|---|---|---|
| JP | H07184402 A | 7/1995 |
| JP | 2008199902 A | 9/2008 |
| JP | 2013223531 A | 10/2013 |

OTHER PUBLICATIONS

Notice of First Office Action for Patent Application No. 201780076341.9, issued by The National Intellectual Property Administration of the People's Republic of China dated Nov. 27, 2020.

International Search Report and (ISA/237) Written Opinion of the International Search Authority for International Patent Application No. PCT/JP2017/045001, issued/mailed by the Japan Patent Office dated Mar. 13, 2018.

* cited by examiner

FIG. 12

| COLOR OF LAWN GRASSES | HARDNESS OF LAWN GRASSES | | |
|---|---|---|---|
| | HARD | NORMAL | SOFT |
| REDDISH BROWN | NONE | KOREAN LAWN GRASS | KOREAN LAWN GRASS |
| YELLOWISH GREEN | | | HIME KOREAN LAWN GRASS |
| GREEN | WILD LAWN GRASSES | NONE | NONE |
| DARK GREEN | WESTERN LAWN GRASSES | | |

| TYPES OF LAWN GRASSES | DETERMINATION CRITERIA USED FOR PROCESS OF JUDGING STATE OF LAWN GRASSES | DETERMINATION CRITERIA USED FOR PROCESS OF JUDGING STATE OF BLADE |
|---|---|---|
| HIME KOREAN LAWN GRASS | DETERMINATION CRITERION A, DETERMINATION CRITERION B | DETERMINATION CRITERION A, DETERMINATION CRITERION D |
| KOREAN LAWN GRASS | DETERMINATION CRITERION A | DETERMINATION CRITERION E, DETERMINATION CRITERION F |
| WESTERN LAWN GRASSES | DETERMINATION CRITERION C | DETERMINATION CRITERION E |
| WILD LAWN GRASSES | DETERMINATION CRITERION B, DETERMINATION CRITERION D | DETERMINATION CRITERION B, DETERMINATION CRITERION F |

| SHAPES OF CUT PORTIONS (1402) | COLOR OF CUT PORTIONS (1404) | | |
|---|---|---|---|
| | GREEN | GREEN AND WHITE | YELLOW – BROWN |
| LOW RELATIVE ROUGHNESS / SWELL AT MIDDLE PORTION | GROWTH STATE: GOOD / CUT STATE: GOOD | NONE | GROWTH STATE: BAD / CUT STATE: GOOD (1406) |
| LOW RELATIVE ROUGHNESS / NO SWELL AT MIDDLE PORTION | NONE | GROWTH STATE: GOOD / CUT STATE: BAD | GROWTH STATE: BAD / CUT STATE: BAD |
| HIGH RELATIVE ROUGHNESS | | NONE | |

INFORMATION PROCESSING DEVICE, WATER-SUPPLY SYSTEM, INFORMATION PROCESSING SYSTEM AND NON-TRANSITORY COMPUTER READABLE MEDIUM STORING PROGRAM

CROSS REFERENCE TO RELATED APPLICATION

This is a continuation application of International Application No. PCT/JP2017/045001 filed on Dec. 14, 2017, which claims priority to Japanese Patent Application No. 2016-257003 filed in JP on Dec. 28, 2016, the contents of each of which are incorporated herein by reference.

BACKGROUND

1. Technical Field

The present invention relates to an information processing device, a water-supply system, an information processing system and a program.

2. Related Art

In recent years, lawn mowers, cleaners and the like that run autonomously to work have been developed (please see Patent Document 1 or 2, for example). Also, a device that identifies the growth state of lawn based on the color tone of the lawn, and injects water, liquid chemicals and the like has been known (please see Patent Document 3, for example).

PRIOR ART DOCUMENTS

Patent Documents

[Patent Document 1] Japanese Patent Application Publication No. 2016-185099
[Patent Document 2] Japanese Patent Application Publication No. 2013-223531
[Patent Document 3] Japanese Patent Application Publication No. H7-184402

BRIEF DESCRIPTION OF DRAWINGS

FIG. 12 schematically shows one example of a data table 1200.
FIG. 13 schematically shows one example of a data table 1300.
FIG. 14 schematically shows one example of a data table 1400.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Identical or similar portions in figures are given identical reference numbers, and the same explanation is omitted in some cases.

Figure 1:
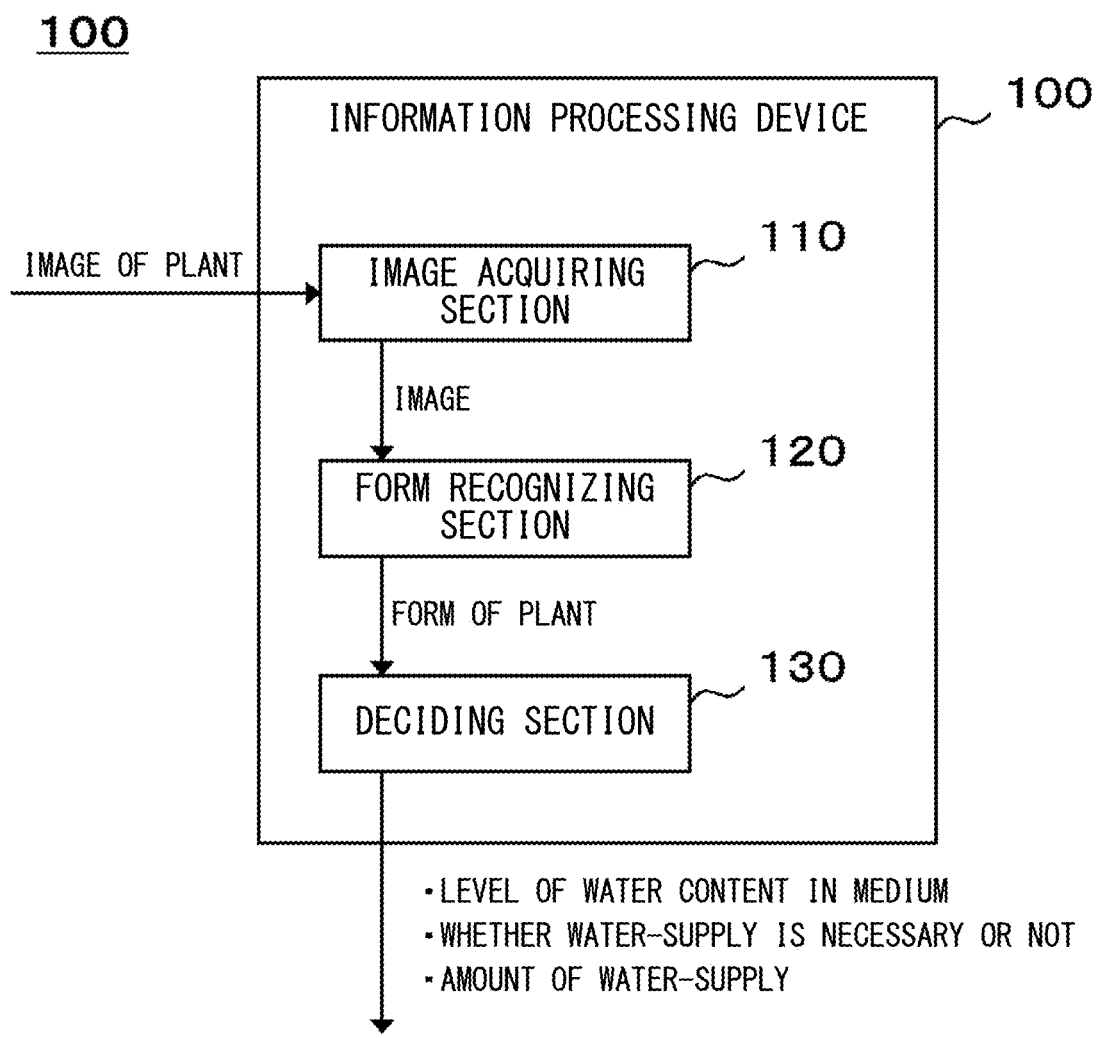
FIG. 1 schematically shows one example of the internal configuration of an information processing device 100.

[Outline of Information Processing Device 100] FIG. 1 schematically shows one example of the internal configuration of an information processing device 100. In the present embodiment, the information processing device 100 includes an image acquiring section 110, a form recognizing section 120 and a deciding section 130.

In the present embodiment, the image acquiring section 110 acquires image data of an image. The image may be a moving image or still image. The image acquiring section 110 for example acquires image data of a plant. The image acquiring section 110 may acquire information in which image data of a plant and positional information indicating a position where the image of the plant was captured are associated with each other. The plant may be one example of an object of an image.

The image acquiring section 110 may be an image-capturing device that captures an image, may be a data processing device that processes image data of an image captured by an image-capturing device, may be a storage device that stores image data of an image captured by an image-capturing device, or may be a communication interface that receives image data of an image captured by an image-capturing device. The above-mentioned image-capturing device may be an image-capturing device mounted on a travelling body that runs autonomously or flies autonomously.

In the present embodiment, the form recognizing section 120 recognizes the form of a plant based on image data acquired by the image acquiring section 110. For example, the form recognizing section 120 recognizes at least either (i) the shape of a plant or (ii) end portions of a plant. In an image recognition process of the form recognizing section 120, a known image recognition technology may be utilized, or an image recognition technology to be newly developed in the future may be utilized. In an image recognition process, an image recognition technology utilizing machine learning may be utilized.

In the present embodiment, based on the form of a plant recognized by the form recognizing section 120, the deciding section 130 decides a parameter about whether water-supply to a plant is necessary or not or the level of water content in a medium of the plant (which may be sometimes referred to as a water-supply parameter). In the present embodiment, the deciding section 130 first recognizes a feature of at least either the shape of the plant or end portions of the plant, based on a result of recognition by the form recognizing section 120.

According to one embodiment, the deciding section 130 analyzes the shape of a plant recognized by the form recognizing section 120, and recognizes a feature of the shape of the plant. A feature of the shape of the plant is recognized. Examples of the feature of the shape of a plant may include: thickness; curvature; inclination angle to a medium; shape of an end portion; color of an end portion; luster of an end portion; whether or not there is variation in colors or thicknesses between end portions and other portions, and details of the variation; and the like.

According to another embodiment, the deciding section 130 extracts, from images acquired by the image acquiring section 110, an image of end portions of a plant based on a result of recognition by the form recognizing section 120. The deciding section 130 analyzes the extracted image, and recognizes a feature of the end portions of the plant. The deciding section 130 may recognize a difference between the feature of the end portions of the plant and a feature of other portions of the plant.

Examples of the feature of end portions of a plant may include the shape, hue and luster of end portions of the plant, and the like. If the plant has been cut, a feature of the end portions of the plant may be a feature of cut portions. Examples of the feature of cut portions may include the shape, hue and luster of cut surfaces, presence or absence, or degree of burrs, presence or absence, or amount of liquid droplets, and the like.

For example, if water or nutriment is insufficient, the following and other features may appear: ends of a plant bend; ends of a plant twist; ends of a plant turn yellow or brown; the luster of ends of a plant lowers; the ratio between the width of end portions of a plant and the width of root portions of the plant becomes lower; irregularity of cut surfaces increases; the amount of liquid droplets at cut surfaces decreases.

Next, the deciding section 130 calculates a water-supply parameter based on a recognized feature. The deciding section 130 may (i) decide a water-supply parameter based on a predetermined determination criterion or (ii) decide a water-supply parameter utilizing a learning model obtained through machine learning. The above-mentioned determination criterion may be information in which one or more factors (which may be sometimes referred to as factors to consider), conditions about respective factors to consider, and water-supply parameters are associated with each other.

Based on what kind of determination criterion a water-supply parameter is decided may be decided by a user or administrator, or may be decided through machine learning. Based on what kind of determination criterion a water-supply parameter is decided may be decided for each type of a plant. The water-supply parameter may be decided based on a cut state of a plant. In this case, based on what kind of determination criterion a water-supply parameter is decided may be decided for each specification of a device that cuts a plant.

A threshold for deciding whether or not a decision target of a water-supply parameter matches a condition about each factor to consider may be decided by a user or administrator, or may be decided through machine learning. The abovementioned threshold may be decided for each type of a plant, or may be decided for each specification of a device that cuts a plant.

In information processing of the deciding section 130, a known image recognition technology may be utilized, or an image recognition technology to be newly developed in the future may be utilized. In an image recognition process, an image recognition technology utilizing machine learning may be utilized. In information processing of the deciding section 130, machine learning may be utilized.

The machine learning may be supervised learning, unsupervised learning, or reinforcement learning. In the learning process, learning techniques using a neural network technology, deep-learning technology or the like may be used.

According to the present embodiment, it is possible to simply examine the state of a medium or whether water-supply is necessary or not. The information processing device 100 according to the present embodiment analyzes data of an image of a plant to recognize the form of the plant, and based on the form of the plant, outputs a parameter about the state of the medium or whether water-supply is necessary or not. Specifically, the information processing device 100 extracts the shape of a plant or end portions of the plant based on the form of the plant, and calculates a parameter about the state of a medium or whether water-supply is necessary or not based on the shape or a feature of the end portions. Thereby, the judgement precision improves greatly as compared with a case where the state of a medium or whether water-supply is necessary or not is judged by simply analyzing the hue of an image.

Taking, as an example, a case where the plant is lawn grasses, even if water-supply to the lawn grasses is insufficient a little, and end portions of some lawn grasses are starting to be withered, root portions of the lawn grasses that have started being withered and other lawn grasses are not withered yet, and the lawn grasses as a whole may look green. Also, if drainage of soil is bad, and roots of lawn grasses have rotted, moss may be growing, and the lawn grasses as a whole may look green. If in such a case, whether water-supply is necessary or not is judged based only on the hue of an image, it is likely that it is determined water-supply is unnecessary. However, according to the information processing device 100 according to the present embodiment, an image of lawn grasses is analyzed, the shape or end portions of the lawn grasses is/are recognized, and the state of a medium or whether water-supply is necessary or not is judged based on the shape of the lawn grasses or a feature of the end portions. Because of this, it is possible to precisely judge the state of a medium or whether water-supply is necessary or not. Also abnormality of lawn grasses can be detected earlier.

[Specific Configuration of Each Section of Information processing device 100] Each section of the information processing device 100 may be realized by hardware, software, or hardware and software. Each section of the information processing device 100 may be, at least partially, realized by a single server or a plurality of servers. Each section of the information processing device 100 may be, at least partially, realized on a virtual server or cloud system. Each section of the information processing device 100 may be, at least partially, realized by a personal computer or mobile terminal. Examples of the mobile terminal may include a mobile phone, a smartphone, a PDA, a tablet, a notebook computer or laptop computer, a wearable computer and the like. The information processing device 100 may store information utilizing a distributed ledger technology or distributed network such as a blockchain.

If at least some of components constituting the information processing device 100 are realized by software, the components realized by the software may be realized by activating, in an information processing device having a general configuration, software or a program stipulating operations about the components. The above-mentioned information processing device may include: (i) a data processing device having processors such as a CPU or a GPU, a ROM, a RAM, a communication interface and the like, (ii) input devices such as a keyboard, touch panel, camera, microphone, various types of sensors or GPS receiver, (iii) output devices such as a display device, a speaker or a vibration device, and (iv) storage devices (including external storage devices) such as a memory or a HDD. In the above-mentioned information processing device, the above-mentioned data processing device or storage devices may store the above-mentioned software or program. Upon being executed by a processor, the above-mentioned software or program causes the above-mentioned information processing device to execute operations stipulated by the software or program. The above-mentioned software or program may be stored in a non-transitory computer-readable recording medium.

The above-mentioned software or program may be a program for causing a computer to function as the information processing device 100. The above-mentioned software or program may be a program for causing a computer to execute: an image acquisition procedure of acquiring image data of a plant; a form recognition procedure of recognizing at least either (i) a shape of the plant or (ii) an end portion of the plant, based on the image data acquired in the image acquisition procedure; and a decision procedure of deciding at least one of (a) a level of water content in a medium of the plant, (b) whether water-supply to the plant is necessary or not, and (c) an amount of water-supply to the plant, based on a feature of at least either the shape of the plant or the end portion of the plant that is recognized in the form recognition procedure.

Figure 2:
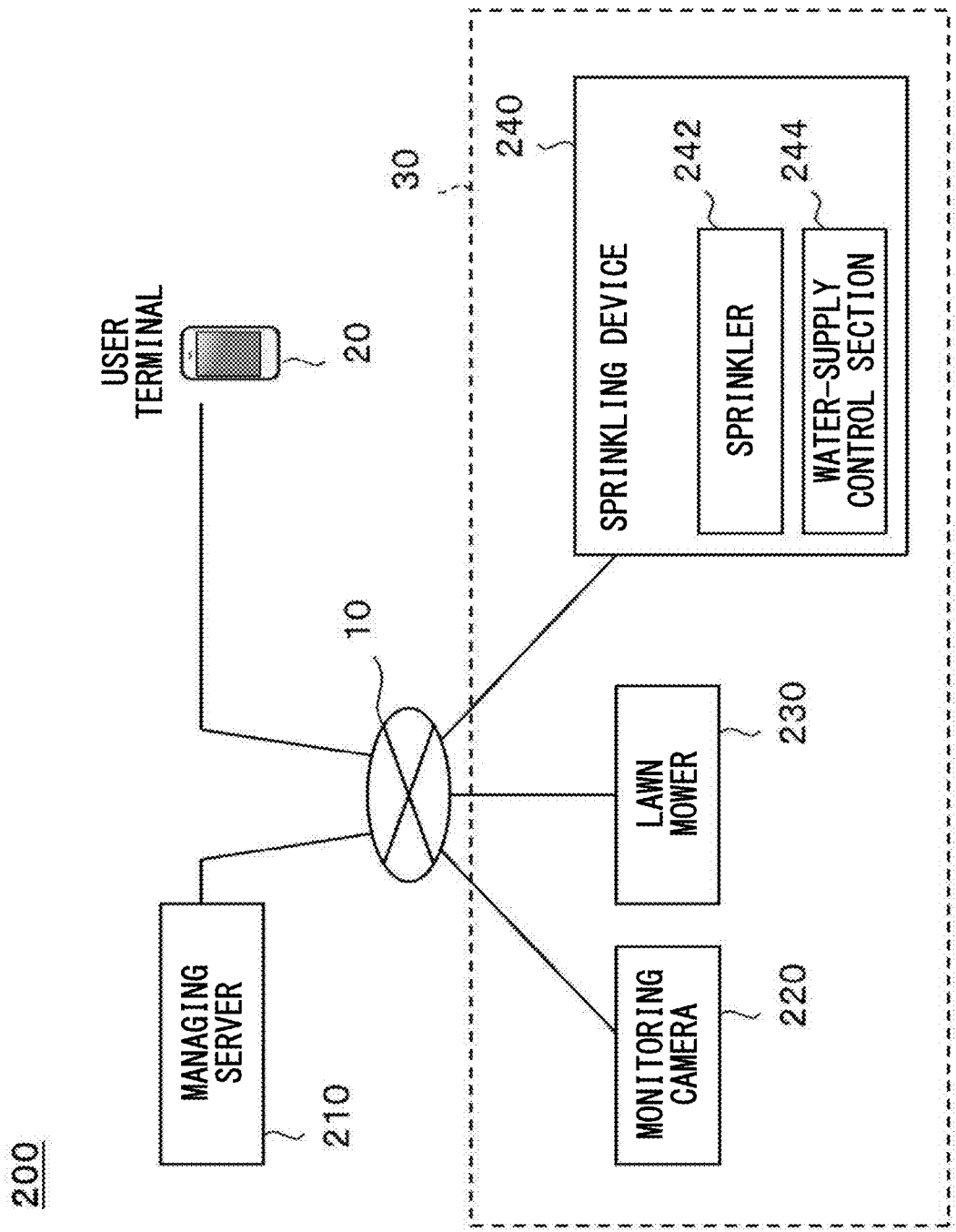
FIG. 2 schematically shows one example of the system configuration of a garden managing system 200.

[Outline of Garden Managing System 200] FIG. 2 schematically shows one example of the system configuration of a garden managing system 200. The garden managing system 200 manages a garden 30. For example, the garden managing system 200 manages the vegetation state of the garden 30. The garden managing system 200 may manage growth of plants cultivated in the garden 30. In the present embodiment, the garden managing system 200 includes a managing server 210, a monitoring camera 220, a lawn mower 230 and a sprinkling device 240. The sprinkling device 240 for example has a sprinkler 242 and a water-supply control section 244.

The garden managing system 200 may be one example of a water-supply system, information processing system or control device. The managing server 210 may be one example of a water-supply system, information processing device or control device. The monitoring camera 220 may be one example of an image-capturing section or image acquiring section. The lawn mower 230 may be one example of a work machine, water-supply system, information processing system, control device, image-capturing section or image acquiring section. The sprinkling device 240 may be one example of a water-supply section. The sprinkler 242 may be one example of a water-supply section. The water-supply control section 244 may be one example of a water-supply section.

In the present embodiment, each section of the garden managing system 200 can transmit and receive information to and from each other via a communication network 10. Each section of the garden managing system 200 may transmit and receive information to and from a user terminal 20 via the communication network 10. In the present embodiment, the monitoring camera 220, the lawn mower 230 and the sprinkling device 240 are disposed inside or around the garden 30.

In the present embodiment, the communication network 10 may be a wired communication transmission path, a wireless communication transmission path, or a combination of a wireless communication transmission path and a wired communication transmission path. The communication network 10 may include a wireless packet communication network, the Internet, a P2P network, a private line, a VPN, an electric power line communication line and the like. The communication network 10: (i) may include a mobile communication network such as a mobile phone line network; and (ii) may include a wireless communication network such as a wireless MAN (for example, WiMAX (registered trademark)), a wireless LAN (for example, WiFi (registered trademark)), Bluetooth (registered trademark), Zigbee (registered trademark) or NFC (Near Field Communication).

In the present embodiment, the user terminal 20 is a communication terminal that a user of the garden 30, the garden managing system 200 or the lawn mower 230 utilizes, and details thereof are not particularly limited. Examples of the user terminal 20 may include a personal computer, mobile terminal and the like. Examples of the mobile terminal may include a mobile phone, a smartphone, a PDA, a tablet, a notebook computer or laptop computer, a wearable computer and the like.

In the present embodiment, the managing server 210 manages the monitoring camera 220, the lawn mower 230 and the sprinkling device 240. For example, the managing server 210 collects information about the garden 30 from at least one of the monitoring camera 220, the lawn mower 230 and the sprinkling device 240. The managing server 210 may generate information indicating a geographical distribution (which may be sometimes referred to as map information) of features of the garden 30. The managing server 210 may manage the state of at least one of the monitoring camera 220, lawn mower 230 and sprinkling device 240. The managing server 210 may control operation of at least one of the monitoring camera 220, the lawn mower 230 and the sprinkling device 240.

In the present embodiment, the monitoring camera 220 monitors the garden 30. For example, the monitoring camera 220 captures an image of a work area of the lawn mower 230. The monitoring camera 220 may capture an image of the lawn mower 230 while it is working. The monitoring camera 220 may capture an image of a work target of the lawn mower 230. The monitoring camera 220 may capture an image of lawn grasses present around the lawn mower 230 while it is working. The monitoring camera 220 may capture an image of lawn grasses present in the forward direction in terms of a course of the lawn mower 230. The monitoring camera 220 may capture an image of lawn grasses present in a region that the lawn mower 230 passed through. Lawn grasses may be one example of a work target of the lawn mower 230. Lawn grasses may be one example of an object of image data.

In the present embodiment, the lawn mower 230 has an autonomous travel function. The lawn mower 230 cuts lawn grasses while it is running autonomously in the garden 30. To cut lawn grasses (which may be sometimes referred to as lawn mowing) may be one example of a work of the lawn mower 230, and lawn grasses may be one example of a work target of the lawn mower 230. Lawn grasses may be one example of plants growing in the garden 30.

In one embodiment, the lawn mower 230 has a communication function. The lawn mower 230 for example transmits and receives information to and from at least one of the managing server 210, the monitoring camera 220 and the sprinkling device 240 via the communication network 10. For example, the lawn mower 230 travels in the garden 30, performs lawn mowing, and so on based on an instruction from the managing server 210. Lawn mower 230 may collect information about the garden 30 while it is travelling or working, and transmit the information to the managing server 210. The information about the garden 30 may be information about an ecological system in the garden 30. The information about the garden 30 may be information about vegetation of the garden 30. The information about the garden 30 may be information about the state of lawn grasses.

In another embodiment, the lawn mower 230 may have an image-capturing device mounted thereon. The lawn mower 230 may capture an image of lawn grasses present around the lawn mower 230 using the image-capturing device. The lawn mower 230 may capture an image of lawn grasses present in the forward direction in terms of a course of the lawn mower 230. Thereby, close-up image-capturing of lawn grasses that the lawn mower 230 is about to cut at the moment becomes possible. The lawn mower 230 may capture an image of lawn grasses present in a region that the lawn mower 230 passed through. Thereby, close-up image-capturing of lawn grasses cut by the lawn mower 230 becomes possible.

The lawn mower 230 may execute various types of judgment processes based on an image of lawn grasses captured by an image-capturing device. For example, the lawn mower 230 judges the state of the lawn mower 230 based on an image of lawn grasses captured by the image-capturing device. The lawn mower 230 may control at least either travel or work of the lawn mower 230 based on an image of lawn grasses captured by the image-capturing device. The lawn mower 230 may judge whether or not water has been supplied to the garden 30 based on an image of lawn grasses captured by the image-capturing device.

In the present embodiment, the sprinkling device 240 supplies water to plants growing in the garden 30. The sprinkling device 240 may supply water to plants based on a decision by the managing server 210 or lawn mower 230. The sprinkling device 240 may be installed in the garden 30 or may be mounted on the lawn mower 230.

In the present embodiment, the sprinkler 242 sprinkles water. The sprinkler 242 may sprinkle water containing fertilizer components. In the present embodiment, the water-supply control section 244 controls the amount of water to be supplied to the sprinkler 242. For example, the water-supply control section 244 receives, from the managing server 210 or lawn mower 230, an instruction about water-supply. The water-supply control section 244 controls the start or stop of water-supply based on the above-mentioned instruction. The water-supply control section 244 may adjust the amount of water-supply based on the above-mentioned instruction.

[Specific Configuration of Each Section of Garden Managing System 200] Each section of the garden managing system 200 may be realized by hardware, software, or hardware and software. Each section of the garden managing system 200 may be, at least partially, realized by a single server or a plurality of servers. Each section of the garden managing system 200 may be, at least partially, realized on a virtual server or cloud system. Each section of the garden managing system 200 may be, at least partially, realized by a personal computer or mobile terminal. Examples of the mobile terminal may include a mobile phone, a smartphone, a PDA, a tablet, a notebook computer or laptop computer, a wearable computer and the like. The garden managing system 200 may store information utilizing a distributed ledger technology or distributed network such as a blockchain.

If at least some of components constituting the garden managing system 200 are realized by software, the components realized by the software may be realized by activating, in an information processing device having a general configuration, software or a program stipulating operations about the components.

The above-mentioned information processing device may include: (i) a data processing device having processors such as a CPU or a GPU, a ROM, a RAM, a communication interface and the like, (ii) input devices such as a keyboard, touch panel, camera, microphone, various types of sensors or GPS receiver, (iii) output devices such as a display device, a speaker or a vibration device, and (iv) storage devices (including external storage devices) such as a memory or a HDD. In the above-mentioned information processing device, the above-mentioned data processing device or storage devices may store the above-mentioned software or program. Upon being executed by a processor, the above-mentioned software or program causes the above-mentioned information processing device to execute operations stipulated by the software or program. The above-mentioned software or program may be stored in a non-transitory computer-readable recording medium.

Figure 3:
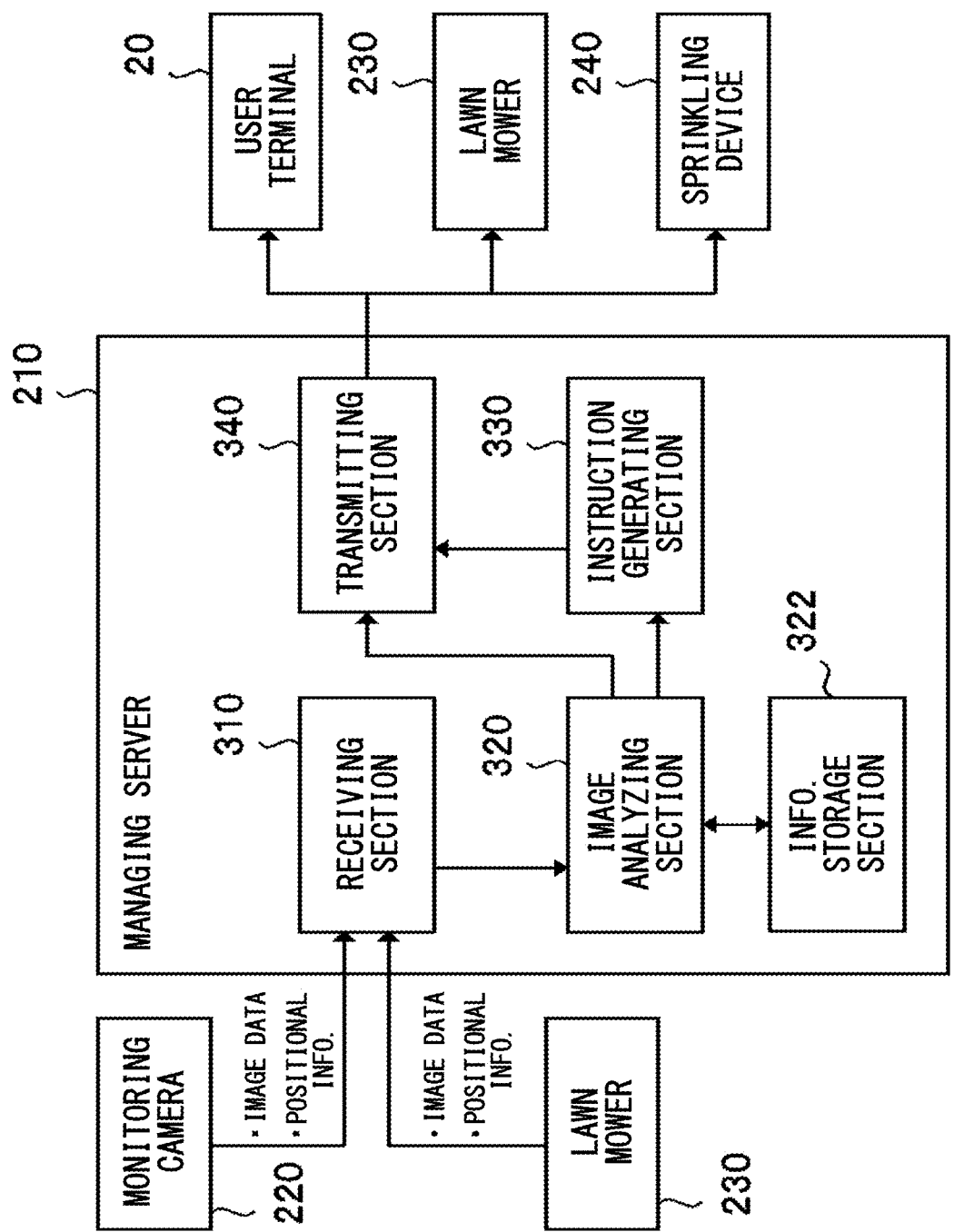
FIG. 3 schematically shows one example of the internal configuration of a managing server 210.

FIG. 3 schematically shows one example of the internal configuration of the managing server 210. In the present embodiment, the managing server 210 includes a receiving section 310, an image analyzing section 320, an information storage section 322, an instruction generating section 330 and a transmitting section 340. Each section of the managing server 210 may transmit and receive information to and from each other, in directions not limited by arrows in the figure.

The receiving section 310 may be one example of an image acquiring section. The image analyzing section 320 may be one example of an information processing device or control device. The image analyzing section 320 may be one example of an image acquiring section, positional information acquiring section, judging section, form recognizing section, deciding section or control parameter deciding section. The instruction generating section 330 may be one example of a control section, travel control section, work control section, deciding section or control parameter deciding section. The transmitting section 340 may be one example of a notifying section.

In the present embodiment, the receiving section 310 acquires information transmitted by at least one of the user terminal 20, the monitoring camera 220, the lawn mower 230 and the sprinkling device 240. For example, the receiving section 310 receives image data from at least either the monitoring camera 220 or the lawn mower 230. Thereby, the managing server 210 can acquire data of an image captured by the monitoring camera or data of an image captured by an image-capturing device mounted on the lawn mower 230. The above-mentioned image may be a still image or moving image. The above-mentioned image data may be image data of a work target (for example, plants such as lawn grasses or weeds) of the lawn mower 230. The receiving section 310 may receive positional information associated with the above-mentioned image data. The receiving section 310 transmits the above-mentioned image data to the image analyzing section 320. If positional information is associated with the above-mentioned image data, the receiving section 310 may transmit the image data and the positional information to the image analyzing section 320.

In the present embodiment, the image analyzing section 320 analyzes image data. The image analyzing section 320 may analyze image data utilizing an image recognition technique. The above-mentioned image recognition technique may be a known image recognition technique or may be an image recognition technique to be newly developed in the future. In the above-mentioned image recognition technique, a machine-learning technique or deep-learning technique may be utilized.

For example, the image analyzing section 320 acquires, from the receiving section 310, image data of an image to be a target of analysis. The image analyzing section 320 analyzes the above-mentioned image data, and generates at least either (i) various types of parameters about the lawn mower 230 or garden 30, or (ii) various types of map information about the garden 30. Examples of the map information may include a geographical distribution of various types of parameters in the garden 30, a vegetation distribution in the garden 30, and the like.

Examples of the various types of parameters may include (i) a parameter indicating the state of the lawn mower 230 (which may be sometimes referred to as a state parameter), (ii) a parameter for controlling the lawn mower 230 (which may be sometimes referred to as a control parameter), (iii) a parameter about whether water-supply to plants in the garden 30 is necessary or not, or the level of water content in a medium of the plants (which may be sometimes referred to as a water-supply parameter), and the like. The state parameter may be a parameter indicating the state of a blade to cut lawn grasses. The blade may be one example of a cutting section.

The state parameter may be a parameter indicating (i) the cutting performance of a blade of the lawn mower 230, (ii) whether maintenance of or a check on the blade is necessary or not, (iii) recommended timing of maintenance of or a check on the blade, or time left until the timing, or the like. Examples of the maintenance may include polish, repair, replacement and the like. Examples of the control parameter may include (i) a parameter for controlling travel of the lawn mower 230, (ii) a parameter for controlling work of the lawn mower 230, and the like.

The parameter about the level of water content in a medium may be the water content in the medium. Examples of the parameter about whether water-supply is necessary or not may include information indicating that water-supply is necessary, information indicating that water-supply is unnecessary, information indicating the amount of water that should be supplied to a medium (which may be sometimes referred to as the amount of water-supply), and the like. The amount of water-supply may be a water supply amount per time or a water supply amount per area, volume or weight of a medium. If the amount of water-supply is 0 or if the amount of water-supply is smaller than a predetermined value, information indicating that water-supply is unnecessary may be generated. If the amount of water-supply exceeds the predetermined value, information indicating that water-supply is necessary may be generated.

The image analyzing section 320 may output a result of analysis of image data to the instruction generating section 330 or transmitting section 340. In one embodiment, the image analyzing section 320 transmits at least one of the state parameter, the control parameter and the water-supply parameter to the instruction generating section 330. The image analyzing section 320 transmits the above-mentioned parameter to the instruction generating section 330 in a map information format. In another embodiment, if at least one of the state parameter, the control parameter and the water-supply parameter satisfies a predetermined condition, the image analyzing section 320 generates a message to notify the user terminal 20 of such a fact. The image analyzing section 320 outputs the above-mentioned message to the transmitting section 340.

In the present embodiment, the information storage section 322 stores various types of information. The information storage section 322 may store information to be utilized in image analysis processing at the image analyzing section 320. The information storage section 322 may store a result of analysis by the image analyzing section 320. For example, the information storage section 322 stores learning data for machine learning of the image analyzing section 320. Also, the information storage section 322 stores a learning model constructed through machine learning of the image analyzing section 320. The information storage section 322 may store image data acquired by the receiving section 310, various types of parameters and various types of maps generated by the image analyzing section 320, and the like.

In the present embodiment, the instruction generating section 330 generates an instruction to at least either the lawn mower 230 or the sprinkling device 240. For example, the instruction generating section 330 receives information indicating a result of analysis by the image analyzing section 320 from the image analyzing section 320, and generates an instruction to at least either the lawn mower 230 or the sprinkling device 240 based on the result of analysis. The instruction generating section 330 may generate an instruction based on at least one parameter, may generate an instruction based on at least one piece of map information, and may generate an instruction based on at least one parameter and at least one piece of map information.

According to one embodiment, if a state parameter included in the above-mentioned result of analysis satisfies a predetermined condition, the instruction generating section 330 generates an instruction for displaying, on a user interface of the lawn mower 230, a message corresponding to the above-mentioned condition. For example, if the state parameter indicates that maintenance of or a check on a blade is necessary, the instruction generating section 330 generates an instruction for displaying, on the user interface of the lawn mower 230, a message indicating that maintenance of or a check on the blade is recommended.

According to another embodiment, if the above-mentioned result of analysis includes a control parameter or if a control parameter included in the above-mentioned result of analysis satisfies a predetermined condition, the instruction generating section 330 generates an instruction for controlling the lawn mower 230. According to still another embodiment, if a water-supply parameter included in the above-mentioned result of analysis satisfies a predetermined condition, the instruction generating section 330 generates an instruction for controlling the sprinkling device 240.

In the present embodiment, the transmitting section 340 transmits information to at least one of the user terminal 20, the lawn mower 230 and the sprinkling device 240. According to one embodiment, the transmitting section 340 transmits a message generated by the image analyzing section 320 to at least one of the user terminal 20, the lawn mower 230 and the sprinkling device 240. According to another embodiment, the transmitting section 340 transmits an instruction generated by the instruction generating section 330 to at least one of the user terminal 20, the lawn mower 230 and the sprinkling device 240. Thereby, a result of analysis by the image analyzing section 320 can be notified to a user, transmitted to the lawn mower 230 or sprinkling device 240, and so on.

Figure 4:
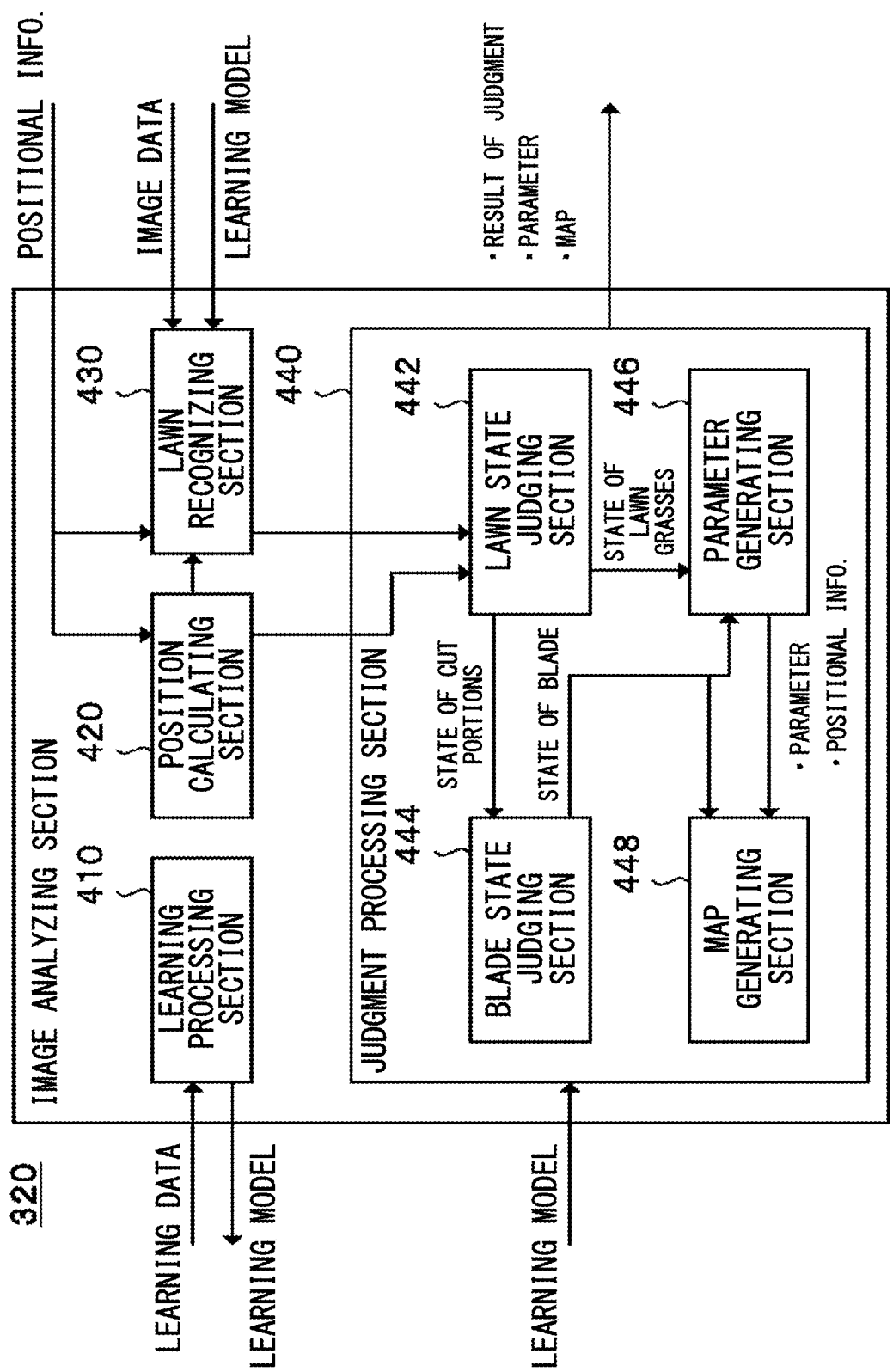
FIG. 4 schematically shows one example of the internal configuration of an image analyzing section 320.

[Configuration of Image Analyzing section 320] FIG. 4 schematically shows one example of the internal configuration of the image analyzing section 320. The image analyzing section 320 includes a learning processing section 410, a position calculating section 420, a lawn recognizing section 430 and a judgment processing section 440. The judgment processing section 440 for example has a lawn state judging section 442, a blade state judging section 444, a parameter generating section 446 and a map generating section 448. Each section of the image analyzing section 320 may transmit and receive information to and from each other, in directions not limited by arrows in the figure.

The position calculating section 420 may be one example of a positional information acquiring section. The lawn recognizing section 430 may be one example of a form recognizing section. The judgment processing section 440 may be one example of an information processing device or control device. The judgment processing section 440 may be one example of an image acquiring section, positional information acquiring section, specification information acquiring section, judging section, form recognizing section, deciding section or control parameter deciding section. The lawn state judging section 442 may be one example of a feature recognizing section. The blade state judging section 444 may be one example of a judging section. The parameter generating section 446 may be one example of a deciding section or control parameter deciding section.

In the present embodiment, through machine learning, the learning processing section 410 constructs various types of learning models to be utilized in the image analyzing section 320. The learning processing section 410 may construct a learning model utilizing a deep-learning technique. For example, the learning processing section 410 constructs a learning model utilizing learning data stored in the information storage section 322. The learning processing section 410 may store the constructed learning model in the information storage section 322. Thereby, the lawn recognizing section 430 or judgment processing section 440 can execute an image recognition process utilizing the learning model constructed by the learning processing section 410.

The learning processing section 410 may separate a work area of the lawn mower 230 into a plurality of subareas, and construct various types of learning models for the respective subareas. For example, the learning processing section 410 constructs a learning model of each subarea utilizing image data of lawn grasses captured in each subarea. The learning processing section 410 may construct a learning model of each subarea utilizing supervisor data prepared for each subarea. The learning processing section 410 may construct a learning model of each subarea utilizing a feature about the shapes of lawn grasses extracted by the lawn recognizing section 430 from image data of lawn grasses an image of which has been captured in each subarea.

In the present embodiment, the position calculating section 420 acquires, from the receiving section 310, positional information indicating a position where an image to be a target of analysis by the image analyzing section 320 was captured. Based on the above-mentioned positional information, the position calculating section 420 calculates a position of an object of the above-mentioned image. For example, the position calculating section 420 calculates a position of lawn grasses in a work area based on positional information associated with image data of an image capturing the lawn grasses. Examples of the above-mentioned positional information may include positional information indicating a position of the monitoring camera 220 that captured the above-mentioned image, positional information indicating a position of the lawn mower 230 at the time when it captured the above-mentioned image, and the like. The position calculating section 420 may transmit positional information indicating a position of an object of an image to the lawn state judging section 442.

In one embodiment, the position calculating section 420 calculates a positional relationship between an image-capturing device that captured an image to be a target of analysis and an object in the image. The position calculating section 420 calculates a position of an object based on a position of the image-capturing device and the above-mentioned positional relationship. For example, the position calculating section 420 calculates a position of an object in an image based on positional information associated with image data, an image-capturing condition of the image, and the geometrical arrangement of an image-capturing device in the lawn mower 230 or garden 30. Examples of the image-capturing condition may include (i) an angle of view, (ii) at least one of a pan angle, a tilt angle and a roll angle, (iii) a zoom factor and the like. Thereby, a position of an object can be calculated highly precisely.

In another embodiment, the position calculating section 420 judges whether or not an image to be a target of analysis includes an object or region the position and size of which are known. If an image to be a target of analysis includes an object or region the position and size of which are known, together with an object to be a target of judgment by the judgment processing section 440, the position calculating section 420 calculates a positional relationship between the above-mentioned object and the above-mentioned object or region. The position calculating section 420 calculates a position of an object based on the position of the above-mentioned object or region and the above-mentioned positional relationship. Thereby, a position of the object can be calculated highly precisely.

In the present embodiment, the lawn recognizing section 430 acquires, from the receiving section 310, image data of an image to be a target of analysis by the image analyzing section 320. The lawn recognizing section 430 may acquire, from the receiving section 310, positional information indicating a position where the above-mentioned image was captured. The lawn recognizing section 430 may acquire, from the position calculating section 420, positional information indicating a position of an object in the above-mentioned image. In the present embodiment, utilizing an image recognition technique, the lawn recognizing section 430 determines whether or not an image to be a target of analysis includes a target of judgment by the judgment processing section 440. The target of judgment may be an object in an image or a background in an image. There may be one or more targets of judgment.

If an image to be a target of analysis includes a target of judgment by the judgment processing section 440, the lawn recognizing section 430 recognizes the target of judgment by the judgment processing section 440, and extracts, from the image to be the target of analysis, at least one of (i) an image of the target of judgment, (ii) an outline or shape of the target of judgment and (iii) a feature of the target of judgment. The lawn recognizing section 430 transmits, to the lawn state judging section 442, information about an image, outline, shape, feature and the like of the target of judgment by the judgment processing section 440. The lawn recognizing section 430 may transmit, to the lawn state judging section 442 and in association with each other, (i) information about an image, outline, shape, feature and the like of the target of judgment by the judgment processing section 440 and (ii) positional information indicating a position where the image to be the target of analysis was captured or a position of an object in the image.

The lawn recognizing section 430 may store, in the information storage section 322, image data acquired from the receiving section 310. The lawn recognizing section 430 may store, in the information storage section 322, information about an image, outline, shape, feature and the like of the target of judgment by the judgment processing section 440. The lawn recognizing section 430 may store, in the information storage section 322 and in association with each other, the above-mentioned data image or above-mentioned information, and positional information indicating a position where the image was captured or a position of an object in the image. The lawn recognizing section 430 may store, in the information storage section 322, the above-mentioned data image or above-mentioned information as learning data of the learning processing section 410.

In the present embodiment, the lawn recognizing section 430 recognizes the form of lawn grasses present in an image (which may be sometimes referred to as lawn grasses included in an image). The lawn recognizing section 430 recognizes the form of at least one lawn grass among one or more lawn grasses present in an image. The lawn grasses may be one example of a target of judgment by the judgment processing section 440. For example, the lawn recognizing section 430 analyzes an image acquired from the receiving section 310, and recognizes at least either (i) the shapes of lawn grasses or (ii) end portions of lawn grasses that are included in the image.

As explained using FIG. 1, in one embodiment, the lawn recognizing section 430 recognizes the respective shapes of a plurality of lawn grasses. The lawn recognizing section 430 may treat the entire image as a target, and recognize the respective shapes of a plurality of lawn grasses included in the image. The lawn recognizing section 430 may treat a partial region of an image as a target, and recognize the respective shapes of one or more lawn grasses included in the region. Examples of the above-mentioned region may include a focused region, a region that satisfies a condition about colors and the like. The lawn recognizing section 430 may recognize end portions of recognized lawn grasses based on the shapes of the lawn grasses.

In another embodiment, the lawn recognizing section 430 extracts, from within an image, a region that is likely to include many end portions of a plurality of lawn grasses. For example, the lawn recognizing section 430 extracts, as a region that is likely to include many end portions of a plurality of lawn grasses, one of a plurality of images that are obtained by dividing, in the vertical direction, an image laterally capturing the plurality of lawn grasses. Thereby, the lawn recognizing section 430 can recognize end portions of a plurality of lawn grasses without recognizing the respective shapes of the lawn grasses. As a result, depending on images, time required to recognize end portions of lawn grasses can be shortened significantly.

The lawn recognizing section 430 (i) may recognize the form of lawn grasses based on a predetermined determination criterion or algorithm, or (ii) may recognize the form of lawn grasses utilizing a learning model obtained through machine learning. The above-mentioned determination criterion may be a general criterion for extracting an outline of an object, or information indicating a condition about each among one or more factors to consider to be used for extracting the shapes or end portions of lawn grasses.

Based on what kind of determination criterion the form of lawn grasses is judged may be decided by a user or administrator, or may be decided through machine learning. Based on what kind of determination criterion the form of lawn grasses is judged may be decided for each type of lawn grasses, or may be decided for each specification of the lawn mower 230. A threshold about the above-mentioned determination criterion may be decided by a user or administrator, or may be decided through machine learning. The above-mentioned threshold may be decided for each type of lawn grasses, or may be decided for each specification of the lawn mower 230.

For example, the lawn recognizing section 430 recognizes the form of lawn grasses utilizing a learning model constructed by the learning processing section 410. The lawn recognizing section 430 may acquire specification information of the lawn mower 230, and select a learning model matching a specification of the lawn mower 230. The lawn recognizing section 430 may select a learning model matching the type of lawn grasses. For example, the lawn recognizing section 430 acquires map information about vegetation of the garden 30, and estimates the type of lawn grasses captured. The lawn recognizing section 430 may estimate the type of lawn grasses captured, based on positional information indicating a position where an image to be a target of analysis was captured or a position of an object in the image, and the above-mentioned map information.

The lawn recognizing section 430 may execute the above-mentioned process for each piece among a plurality of pieces of image data received by the receiving section 310. The lawn recognizing section 430 may separate a work area of the lawn mower 230 into a plurality of subareas, and execute the above-mentioned recognition process for each subarea. The lawn recognizing section 430 may execute the above-mentioned recognition process for a predetermined number of pieces of image data for each subarea.

[Outline of Judgment Processing section 440] In the present embodiment, the judgment processing section 440 executes various types of judgment processes. The judgment processing section 440 may execute the judgment processes utilizing information indicating the form of lawn grasses recognized by the lawn recognizing section 430. Thereby, judgment precision can be improved. In one embodiment, the judgment processing section 440 executes the judgment processes based on a predetermined determination criterion. In another embodiment, the judgment processing section 440 executes the judgment processes utilizing a learning model constructed by the learning processing section 410. The judgment processing section 440 may transmit a result of judgment to the instruction generating section 330 or transmitting section 340.

According to one embodiment, the judgment processing section 440 first judges the state of lawn grasses. Next, the judgment processing section 440 judges the state of the lawn mower 230 based on a result of judgment about the lawn grasses. The judgment processing section 440 may generate a state parameter indicating the state of the lawn mower 230. According to another embodiment, the judgment processing section 440 first judges the state of lawn grasses. Next, the judgment processing section 440 generates a control parameter based on a result of judgment about lawn grasses. According to still another embodiment, the judgment processing section 440 first judges the state of lawn grasses. Next, the judgment processing section 440 generates a water-supply parameter based on a result of judgment about lawn grasses. According to still another embodiment, the judgment processing section 440 generates map information about various types of parameters. The judgment processing section 440 may generate map information about vegetation in the garden 30.

[Outline of Lawn State Judging section 442] In the present embodiment, the lawn state judging section 442 judges the state of lawn grasses based on image data of the lawn grasses acquired by the receiving section 310. For example, the lawn state judging section 442 acquires, from the lawn recognizing section 430, information about the form of lawn grasses recognized by the lawn recognizing section 430. The lawn state judging section 442 judges the state of lawn grasses based on the information about the form of the lawn grasses.

The lawn state judging section 442 (i) may judge the state of lawn grasses based on a predetermined determination criterion, or (ii) may judge the state of lawn grasses utilizing a learning model obtained through machine learning. The above-mentioned determination criterion may be information in which one or more factors to consider, conditions about respective factors to consider and the state of lawn grasses are associated with each other. Examples of the factors to consider for judging the state of lawn grasses may include (i) the type of lawn grasses, (ii) the number or density of lawn grasses, (iii) the shapes of lawn grasses, (iv) the appearance of end portions of lawn grasses, (v) a specification of the lawn mower 230, and the like.

Based on what kind of determination criterion the state of lawn grasses is judged may be decided by a user or administrator, or may be decided through machine learning. Based on what kind of determination criterion the state of lawn grasses is judged may be decided for each type of lawn grasses, or may be decided for each specification of the lawn mower 230. A threshold for deciding whether or not a target of judgment matches a condition about each factor to consider may be decided by a user or administrator, or may be decided through machine learning. The above-mentioned threshold may be decided for each type of lawn grasses, or may be decided for each specification of the lawn mower 230.

The state of lawn grasses may be evaluated by consecutive numerical values, or may be evaluated stepwise using a plurality of steps. Examples of the state of lawn grasses may include the cut state of lawn grasses, the growth state of lawn grasses and the like. The cut state of lawn grasses may be the state of cut surfaces. Examples of the growth state of lawn grasses may include the type of lawn grasses, the density of lawn grasses, whether the growth is good or bad, sufficiency or insufficiency of lawn mowing, sufficiency or insufficiency of water, sufficiency or insufficiency of nutriment and the like. Examples of a parameter indicating sufficiency or insufficiency of water may include at least one of (a) the level of water content in a medium of lawn grasses, (b) whether water-supply to lawn grasses is necessary or not and (c) the amount of water-supply to lawn grasses.

The lawn state judging section 442 transmits a result of judgment about the state of lawn grasses for example to at least either the blade state judging section 444 or the parameter generating section 446. The lawn state judging section 442 may transmit, to at least either the blade state judging section 444 or the parameter generating section 446 and in association with each other, a result of judgment about the state of lawn grasses and the positional information of the lawn grasses.

In one embodiment, the lawn state judging section 442 receives an input of information indicating the form of lawn grasses, and outputs the information indicating the state of the lawn grasses. In another embodiment, the lawn state judging section 442 recognizes a feature of lawn grasses based on the form of the lawn grasses, and judges the state of the lawn grasses based on the feature. In still another embodiment, the lawn state judging section 442 recognizes a feature of end portions of lawn grasses based on the form of the lawn grasses, and judges the state of the lawn grasses based on the feature.

The lawn state judging section 442 (i) may recognize a feature of lawn grasses or a feature of end portions of the lawn grasses based on a predetermined determination criterion, or (ii) may recognize a feature of lawn grasses or a feature of end portions of the lawn grasses utilizing a learning model obtained through machine learning. The above-mentioned determination criterion may be information in which one or more factors to consider, a condition about respective factors to consider and features of lawn grasses or particular features of end portions of the lawn grasses are associated with each other. Examples of the factors to consider for judging a feature of lawn grasses or a feature of end portions of the lawn grasses may include (i) the type of lawn grasses, (ii) the number or density of lawn grasses, (iii) the shapes of lawn grasses, (iv) the appearance of end portions of lawn grasses, (v) a specification of the lawn mower 230, and the like.

Based on what kind of determination criterion a feature of lawn grasses or a feature of end portions of the lawn grasses is judged may be decided by a user or administrator, or may be decided through machine learning. Based on what kind of determination criterion a feature of lawn grasses or a feature of end portions of the lawn grasses is judged may be decided for each type of lawn grasses, or may be decided for each specification of the lawn mower 230. A threshold for deciding whether or not a target of judgment matches a condition about each factor to consider may be decided by a user or administrator, or may be decided through machine learning. The above-mentioned threshold may be decided for each type of lawn grasses. The above-mentioned threshold may be decided for each specification of the lawn mower 230.

Examples of features of lawn grasses may include at least one of (i) the type of lawn grasses, (ii) the number or density of lawn grasses, (iii) the shapes of lawn grasses, and (iv) inclination of lawn grasses to a medium. Examples of features of end portions of lawn grasses may include (i) at least one of the shape, hue and luster of end portions of lawn grasses, (ii) a difference between end portions of lawn grasses and another portion of the lawn grasses, and the like. If lawn grasses are cut, a feature of end portions of the lawn grasses may be a feature of cut portions. Examples of features of cut portions may include (i) at least one of the shape, hue and luster of cut surfaces, (ii) presence or absence, or degree of burrs, (iii) presence or absence, or degree of liquid droplets, and the like.

The lawn state judging section 442 may analyze image data of lawn grasses present in the forward direction in terms of a course of the lawn mower 230, and recognizes a feature of the lawn grasses. The lawn state judging section 442 may analyze image data of lawn grasses present in a region that the lawn mower 230 passed through, and recognize a feature of the lawn grasses. Also, the lawn state judging section 442 may analyze image data of lawn grasses present in a region that the lawn mower 230 passed through, and recognize a feature of cut portions.

In still another embodiment, the lawn state judging section 442 may acquire, from the lawn mower 230, information about an electric current value of a motor to rotate a blade. The lawn state judging section 442 may recognize a feature of lawn grasses based on an electric current value of a motor to rotate a blade. If the lawn mower 230 cuts a hard material, an electric current value of a motor to rotate a blade increases. Also, the hardness of lawn grasses varies depending on the types of lawn grasses. Because of this, an electric current value of a motor can be a factor to consider for judging the type of lawn grasses. The lawn state judging section 442 may recognize a feature of lawn grasses based on image data of the lawn grasses present in the forward direction in terms of a course of the lawn mower 230 and an electric current value of a motor to rotate a blade. For example, the lawn state judging section 442 decides the density of lawn grasses based on a result of image analysis, and decides the hardness of the lawn grasses based on the density of the lawn grasses and an electric current value of a motor.

[Outline of Process at Lawn State Judging section 442] For example, the lawn state judging section 442 first receives, from the lawn recognizing section 430, information indicating the form of lawn grasses recognized by the lawn recognizing section 430. The lawn state judging section 442 may receive, from the lawn recognizing section 430, image data of an image to be a target of analysis. The lawn state judging section 442 may acquire, from the position calculating section 420 or lawn recognizing section 430, positional information indicating a position where an image of lawn grasses was captured or a position of lawn grasses (which may be sometimes referred to as lawn grass positional information).

Next, the lawn state judging section 442 recognizes a feature of lawn grasses or a feature of end portions of the lawn grasses based on information indicating the form of the lawn grasses. A feature of lawn grasses that should be recognized may be any feature as long as it is utilized in a judgment process at the lawn state judging section 442, and specific details are not particularly limited. The lawn state judging section 442 for example recognizes a feature of lawn grasses or a feature of end portions of the lawn grasses utilizing a learning model constructed by the learning processing section 410.

In one embodiment, the lawn state judging section 442 recognizes a feature of lawn grasses or a feature of end portions of the lawn grasses utilizing information indicating the shapes of the lawn grasses. For example, utilizing information indicating the shapes of lawn grasses, the lawn state judging section 442 extracts an image of each lawn grass from an image capturing a plurality of lawn grasses. Then, the lawn state judging section 442 recognizes, about at least one lawn grass: presence or absence of a shape that is unique to each type of lawn grasses; thickness; curvature; inclination angle to a medium; shape of an end portion; color of an end portion; luster of an end portion; whether or not there is variation in colors between end portions and other portions, and details of the variation; and the like.

In another embodiment, the lawn state judging section 442 recognizes a feature of end portions of lawn grasses utilizing information indicating the end portions of the lawn grasses. For example, the lawn state judging section 442 acquires, from the lawn recognizing section 430 and as information indicating end portions of lawn grasses, an image that is likely to include many end portions of lawn grasses. The lawn state judging section 442 may recognize a feature of the image as a feature of end portions of lawn grasses. The lawn state judging section 442 may acquire, from the lawn recognizing section 430 and as an reference image, an image that is likely to include many root portions or middle portions of lawn grasses. The lawn state judging section 442 may recognize, as a feature of end portions of lawn grasses, a difference between a feature of an image that is likely to include many end portions of lawn grasses and a feature of the reference image.

Next, the lawn state judging section 442 judges the state of lawn grasses. For example, the lawn state judging section 442 judges the cut state of lawn grasses based on a feature of end portions of the lawn grasses. The lawn state judging section 442 may judge the growth state of lawn grasses based on at least either a feature of the lawn grasses or a feature of end portions of the lawn grasses. Judgment processes about at least either the cut state or growth state of lawn grasses may be executed utilizing a learning model constructed by the learning processing section 410.

Next, the lawn state judging section 442 outputs a result of judgment about the state of lawn grasses. The lawn state judging section 442 may output, in association with each other, a result of judgment about the state of lawn grasses and positional information of the lawn grasses. In one embodiment, the lawn state judging section 442 transmits, to the blade state judging section 444, a result of judgment about the cut state of lawn grasses. Thereby, the blade state judging section 444 can judge the state of a blade utilizing a result of judgment about the cut state of lawn grasses.

In another embodiment, the lawn state judging section 442 transmits, to the parameter generating section 446, a result of judgment about the growth state of lawn grasses. Thereby, the parameter generating section 446 can generate at least either a control parameter or a water-supply parameter utilizing a result of judgment about the growth state of lawn grasses. As mentioned below, the parameter generating section 446 may generate a control parameter utilizing a result of judgment about the state of a blade.

The lawn state judging section 442 may execute the above-mentioned process for each piece among a plurality of pieces of image data received by the receiving section 310. The lawn state judging section 442 may separate a work area of the lawn mower 230 into a plurality of subareas, and execute the above-mentioned judgment process for each subarea. The lawn state judging section 442 may execute the above-mentioned judgment process for a predetermined number of pieces of image data for each subarea.

[Outline of Blade State Judging section 444] In the present embodiment, the blade state judging section 444 judges the state of a blade of the lawn mower 230.

Examples of the state of a blade may include (i) the cutting performance of the blade, (ii) whether maintenance of or a check on the blade is necessary or not, (iii) recommended timing of maintenance of or a check on the blade, or time left until the timing, and the like. The state of the blade may be evaluated by consecutive numerical values, or may be evaluated stepwise using a plurality of steps.

In the present embodiment, the blade state judging section 444 judges the state of the blade of the lawn mower 230 based on image data acquired by the receiving section 310. For example, the blade state judging section 444 receives a result of judgment about the cut state of lawn grasses from the lawn state judging section 442, and judges the state of the blade of the lawn mower 230 based on the result of judgment. The blade state judging section 444 transmits the result of judgment about the state of the blade for example to at least either the parameter generating section 446 or the map generating section 448. The blade state judging section 444 may transmit, in association with each other, the result of judgment about the state of the blade and positional information of the lawn grasses utilized for the judgment to at least either the parameter generating section 446 or the map generating section 448.

The blade state judging section 444 (i) may judge the state of the blade based on a predetermined determination criterion, or (ii) may judge the state of the blade utilizing a learning model obtained through machine learning. The above-mentioned determination criterion may be information in which one or more factors to consider, conditions about respective factors to consider and the state of lawn grasses are associated with each other. Examples of the factors to consider for judging the state of a blade may include (i) the type of lawn grasses, (ii) at least one of the shape, hue and luster of cut surfaces of lawn grasses, (iii) a specification of the blade and the like.

Based on what kind of determination criterion the state of the blade is judged may be decided by a user or administrator, or may be decided through machine learning. Based on what kind of determination criterion the state of the blade is judged may be decided for each type of lawn grasses, or may be decided for each specification of the lawn mower 230. A threshold for deciding whether or not a target of judgment matches a condition about each factor to consider may be decided by a user or administrator, or may be decided through machine learning. The above-mentioned threshold may be decided for each type of lawn grasses. The above-mentioned threshold may be decided for each specification of the blade.

For example, the blade state judging section 444 acquires information about a specification of the blade, and the blade state judging section 444 judges the state of the blade of the lawn mower 230 based on a result of judgment about the cut state of lawn grasses and the information about the specification of the blade. The information about the specification of a blade is stored for example in a storage device of the lawn mower 230, the information storage section 322 or the like. Examples of a specification of the blade may include the type of the blade, the quality of the material of the blade, the size of the blade and the like. Examples of the type of a blade may include a chip saw, a nylon cutter, a metal blade and the like.

According to one embodiment, the blade state judging section 444 judges whether maintenance of or a check on the blade is necessary or not based on a result of judgment about the cut state of lawn grasses. According to another embodiment, it judges whether maintenance of or a check on the blade is necessary or not based on a result of judgment about the cut state of lawn grasses and information about a specification of the blade. According to still another embodiment, the blade state judging section 444 may judge whether maintenance of or a check on the blade is necessary or not based on a result of judgment about the state of the blade.

In the present embodiment explained, the blade state judging section 444 receives a result of judgment about the cut state of lawn grasses from the lawn state judging section 442. However, the blade state judging section 444 is not limited to the present embodiment. In another embodiment, the blade state judging section 444 may receive information indicating a feature of cut portions of lawn grasses from the lawn state judging section 442. The feature of cut portions of the lawn grasses is obtained for example by the lawn state judging section 442 extracting it from image data. In this case, the blade state judging section 444 may judge the state of a blade based on a feature of cut portions of lawn grasses.

[Outline of Parameter Generating section 446] In the present embodiment, the parameter generating section 446 generates various types of parameters. The parameter generating section 446 generates at least one of a state parameter, a control parameter and a water-supply parameter based on a result of judgment by at least either the lawn state judging section 442 or the blade state judging section 444. For example, the parameter generating section 446 transmits a generated parameter to the map generating section 448.

The parameter generating section 446 may output the generated parameter to the instruction generating section 330 or transmitting section 340. The parameter generating section 446 may output, in association with each other, the parameter and positional information indicating a position at which the parameter is applied.

[State Parameter] In the present embodiment, for example, the parameter generating section 446 receives a result of judgment about the state of the blade from the blade state judging section 444. Then, the parameter generating section 446 generates a state parameter indicating the state of the blade based on a result of judgment about the state of the blade. According to the present embodiment, the state parameter is generated for example based on a feature about at least one of (i) the type of lawn grasses, (ii) the number or density of lawn grasses, (iii) the shapes of lawn grasses, and (iv) the appearance of cut lawn grasses. The appearance of cut lawn grasses may be one example of a feature of cut portions of lawn grasses. The state parameter may be generated based on a specification of the lawn mower 230, an electric current value of a motor to rotate the blade and the like.

[Control Parameter] In one embodiment, the parameter generating section 446 receives a result of judgment about the growth state of lawn grasses from the lawn state judging section 442. Then, the parameter generating section 446 generates a control parameter based on a result of judgment about the growth state of lawn grasses. In another embodiment, the parameter generating section 446 receives a result of judgment about the cut state of lawn grasses from the lawn state judging section 442. Then, the parameter generating section 446 generates a control parameter based on a result of judgment about the cut state of lawn grasses. According to these embodiments, the control parameter is generated for example based on a feature about at least one of (i) the type of lawn grasses, (ii) the number or density of lawn grasses, (iii) the shapes of lawn grasses, and (iv) the appearance of cut lawn grasses. The appearance of cut lawn grasses may be one example of a feature of cut portions of lawn grasses. The control parameter may be generated based on a specification of the lawn mower 230, an electric current value of a motor to rotate a blade and the like. For example, the parameter generating section 446 generates a control parameter about a number of revolution of a motor of the lawn mower 230 to rotate the blade, a travel speed of the lawn mower 230, a travel direction of the lawn mower 230 and the like based on an electric current value of the motor.

In still another embodiment, the parameter generating section 446 receives a result of judgment about the state of the blade from the blade state judging section 444. The parameter generating section 446 generates a control parameter based on a result of judgment about the state of the blade. For example, if the cutting performance of the blade does not satisfy a predetermined condition, the parameter generating section 446 decides the control parameter such that (i) a travel speed of the lawn mower 230 becomes lower or (ii) a rotational speed of the blade becomes higher, as compared with a case where the cutting performance of the blade satisfies the predetermined condition. The parameter generating section 446 may generate the control parameter based on a given combination of a result of judgment about the growth state of lawn grasses, a result of judgment about the cut state of lawn grasses and a result of judgment about the state of the blade.

[Water-Supply Parameter] For example, the parameter generating section 446 receives a result of judgment about the growth state of lawn grasses from the lawn state judging section 442. The parameter generating section 446 generates a water-supply parameter based on a result of judgment about the growth state of lawn grasses. According to the present embodiment, the water-supply parameter is generated for example based on a feature about at least one of (i) the type of lawn grasses, (ii) the number or density of lawn grasses, (iii) the shapes of lawn grasses, and (iv) the appearance of cut lawn grasses. The appearance of cut lawn grasses may be one example of a feature of cut portions of lawn grasses. Thereby, for example, it can decide at least one of (a) the level of water content in a medium of lawn grasses, (b) whether water-supply to lawn grasses is necessary or not, and (c) the amount of water-supply to lawn grasses based on a feature of at least either the shapes of lawn grasses or end portions of lawn grasses. The water-supply parameter may be generated based on a specification of the lawn mower 230, an electric current value of a motor to rotate a blade, and the like.

[Outline of Map Generating section 448] The map generating section 448 generates various types of map information. Map information of each parameter may be one example of the parameter. The map generating section 448 outputs the map information for example to the instruction generating section 330 or transmitting section 340.

In one embodiment, the map generating section 448 receives, from the parameter generating section 446, various types of parameters, and information indicating a position at which the parameters are applied. The map generating section 448 generates map information of each parameter by associating each parameter and information indicating a position at which the parameter is applied. The map generating section 448 may generate the map information utilizing parameters satisfying a predetermined condition.

In another embodiment, the map generating section 448 may acquire, from at least either the lawn state judging section 442 or the blade state judging section 444, (i) positional information indicating a position where an image to be a target of judgment was captured or positional information indicating a position of an object in the image and (ii) information indicating a result of judgment about the target of judgment. The map generating section 448 may generate map information by associating the above-mentioned positional information and information indicating the above-mentioned result of judgment. The map generating section 448 may generate map information utilizing a result of judgment satisfying a predetermined condition. At least either the lawn state judging section 442 or the blade state judging section 444 may output the above-mentioned information to 448 if a result of judgment satisfies a predetermined condition.

In still another embodiment, the map generating section 448 acquires, from the lawn state judging section 442, (i) positional information indicating a position where an image to be a target of judgment was captured, or positional information indicating a position of an object in the image, and (ii) information about at least one of a plant, an animal, a microorganism, soil and waste that are included in each image. The information about at least one of a plant, an animal, a microorganism, soil and waste may be information indicating the type of at least one of a plant, an animal, a microorganism, soil and waste. The map generating section 448 may generate map information by associating the above-mentioned positional information and information indicating the above-mentioned result of judgment. Soil may be one example of a medium of a plant.

Processes at each section in the image analyzing section 320 are not limited to the embodiment explained using FIG. 4. In another embodiment, at least part of information processing at a particular member of the image analyzing section 320 may be executed at another member. For example, in the present embodiment explained, the lawn recognizing section 430 recognizes the form of lawn grasses, and the lawn state judging section 442 judges the state of the lawn grasses based on the form of the lawn grasses. However, the judgment processing section 440 is not limited to the present embodiment. In another embodiment, at least part of information processing at the lawn recognizing section 430 may be executed at the lawn state judging section 442.

Also, in the present embodiment explained, the parameter generating section 446 generates various types of parameters. However, the judgment processing section 440 is not limited to the present embodiment. In another embodiment, at least either the lawn state judging section 442 or the blade state judging section 444 may generate parameters. For example, in the present embodiment explained, the lawn state judging section 442 judges the growth state of lawn grasses based on the form of the lawn grasses, and the parameter generating section 446 generates a water-supply parameter based on a result of judgment about the growth state of the lawn grasses. However, the judgment processing section 440 is not limited to the present embodiment. In another embodiment, the lawn state judging section 442 may generate a water-supply parameter based on the form of lawn grasses. For example, based on the form of lawn grasses, the lawn state judging section 442 decides at least one of (a) the level of water content in a medium of lawn grasses, (b) whether water-supply to lawn grasses is necessary or not, and (c) the amount of water-supply to lawn grasses.

Figure 5:
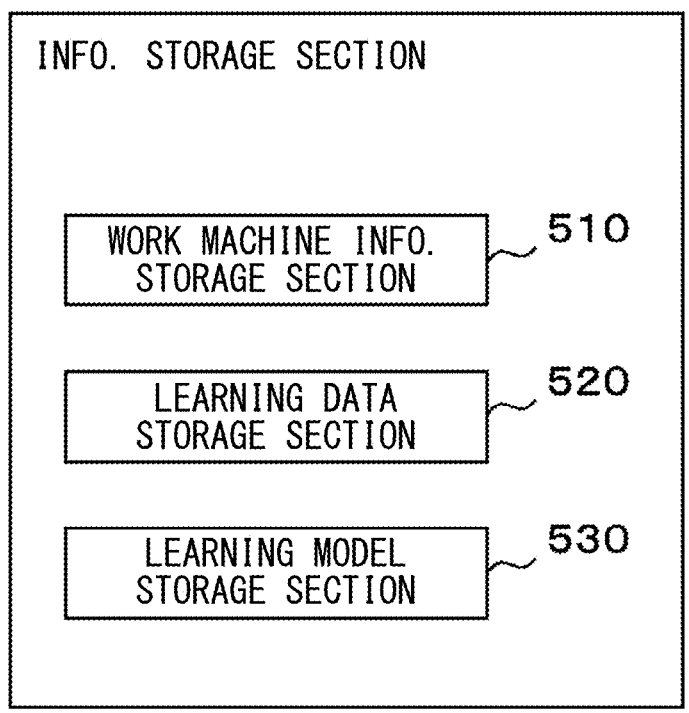
FIG. 5 schematically shows one example of the internal configuration of an information storage section 322.

FIG. 5 schematically shows one example of the internal configuration of the information storage section 322. In the present embodiment, the information storage section 322 includes a work machine information storage section 510, a learning data storage section 520 and a learning model storage section 530. The learning data storage section 520 may be one example of a shape information storage section.

The work machine information storage section 510 stores information about a specification of the lawn mower 230. The learning data storage section 520 stores learning data of the learning processing section 410. The learning model storage section 530 stores learning data corresponding to various conditions. The learning data storage section 520 may store, in association with each other, (i) positional information acquired by the position calculating section 420 and (ii) information about the shapes of lawn grasses recognized by the lawn recognizing section 430. The learning model storage section 530 stores a learning model constructed by the learning processing section 410. The learning model storage section 530 may store learning models corresponding to various conditions.

Figure 6:
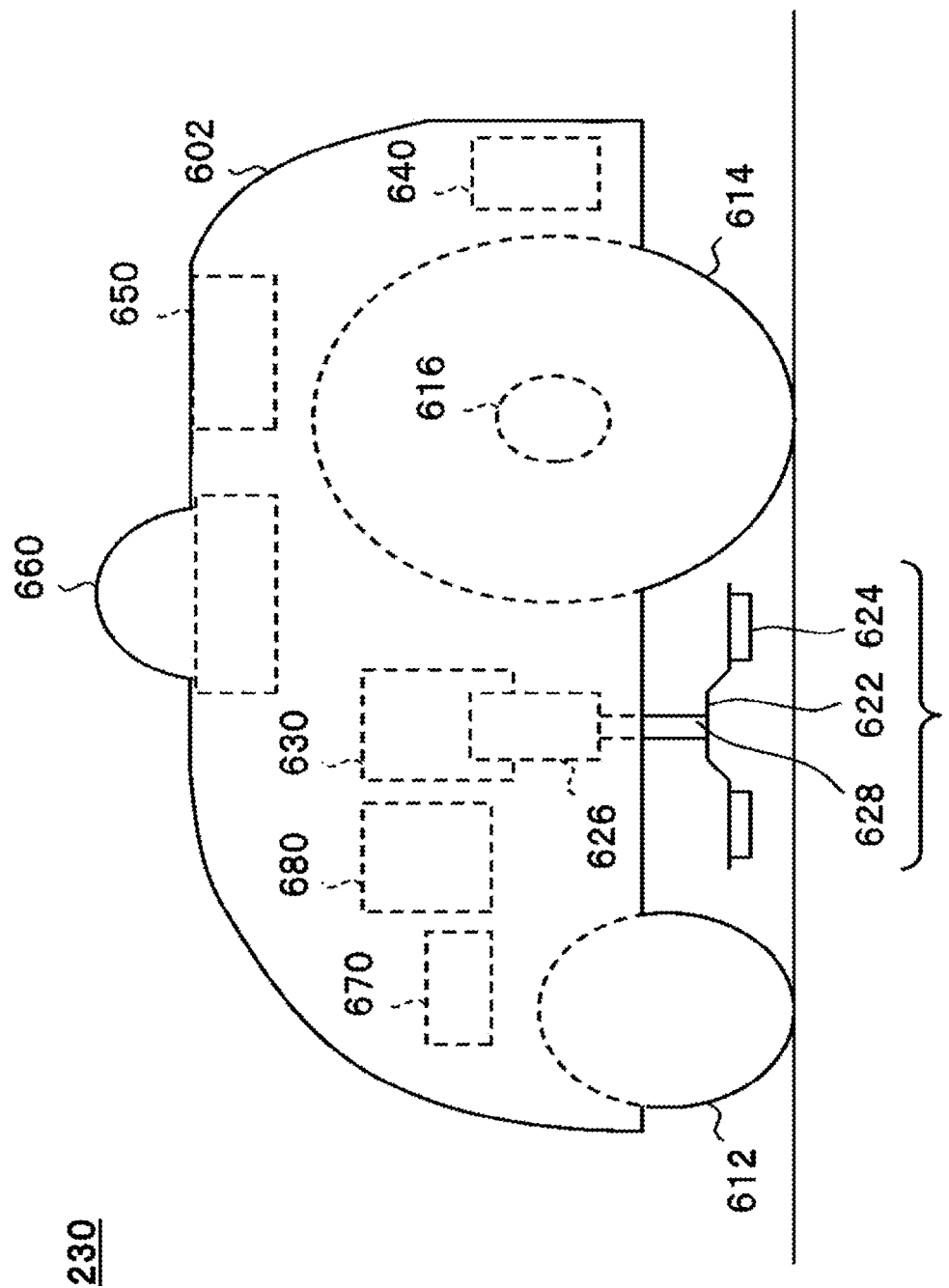
FIG. 6 schematically shows one example of the internal configuration of a lawn mower 230.
Figure 7:
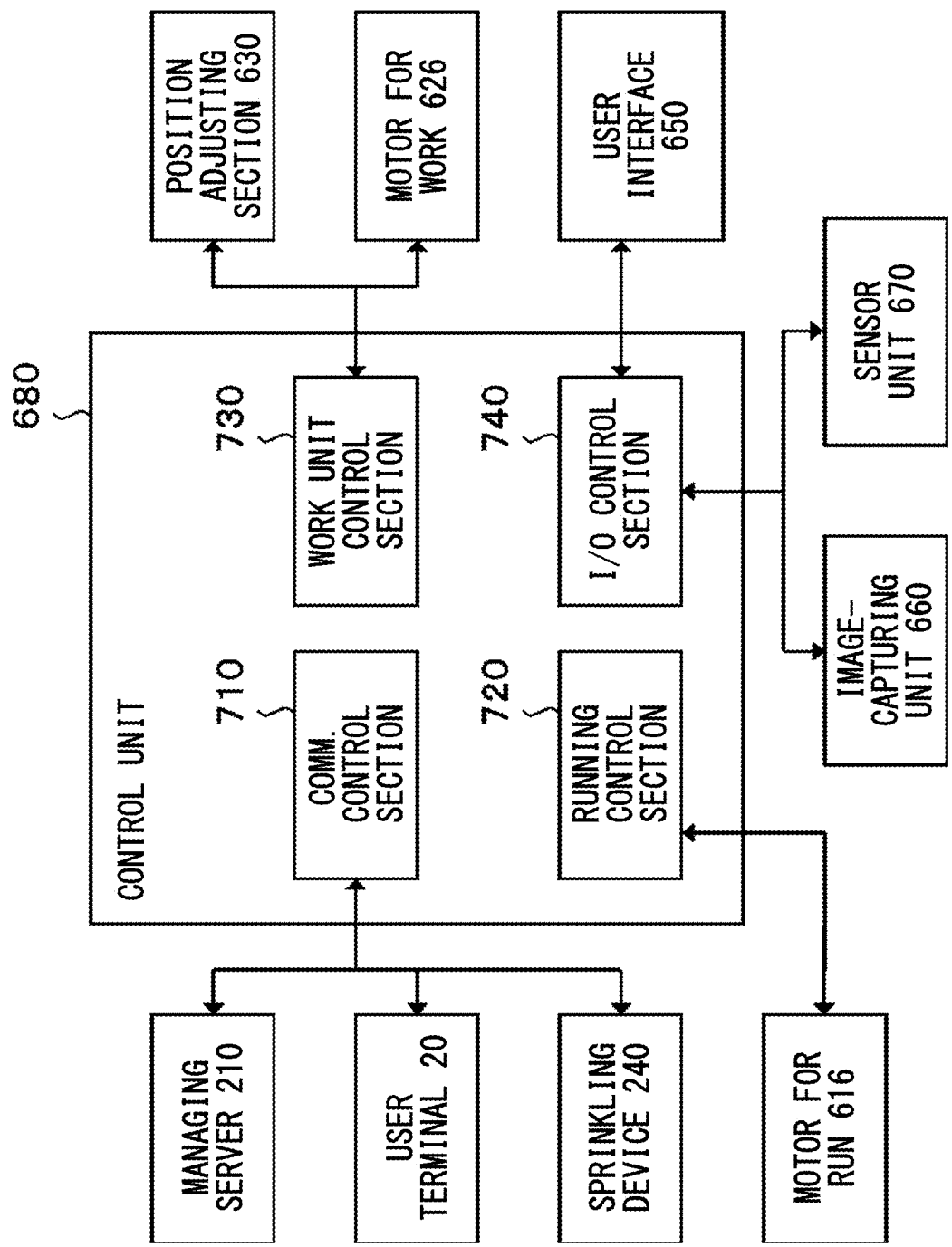
FIG. 7 schematically shows one example of the internal configuration of a control unit 680.
Figure 8:
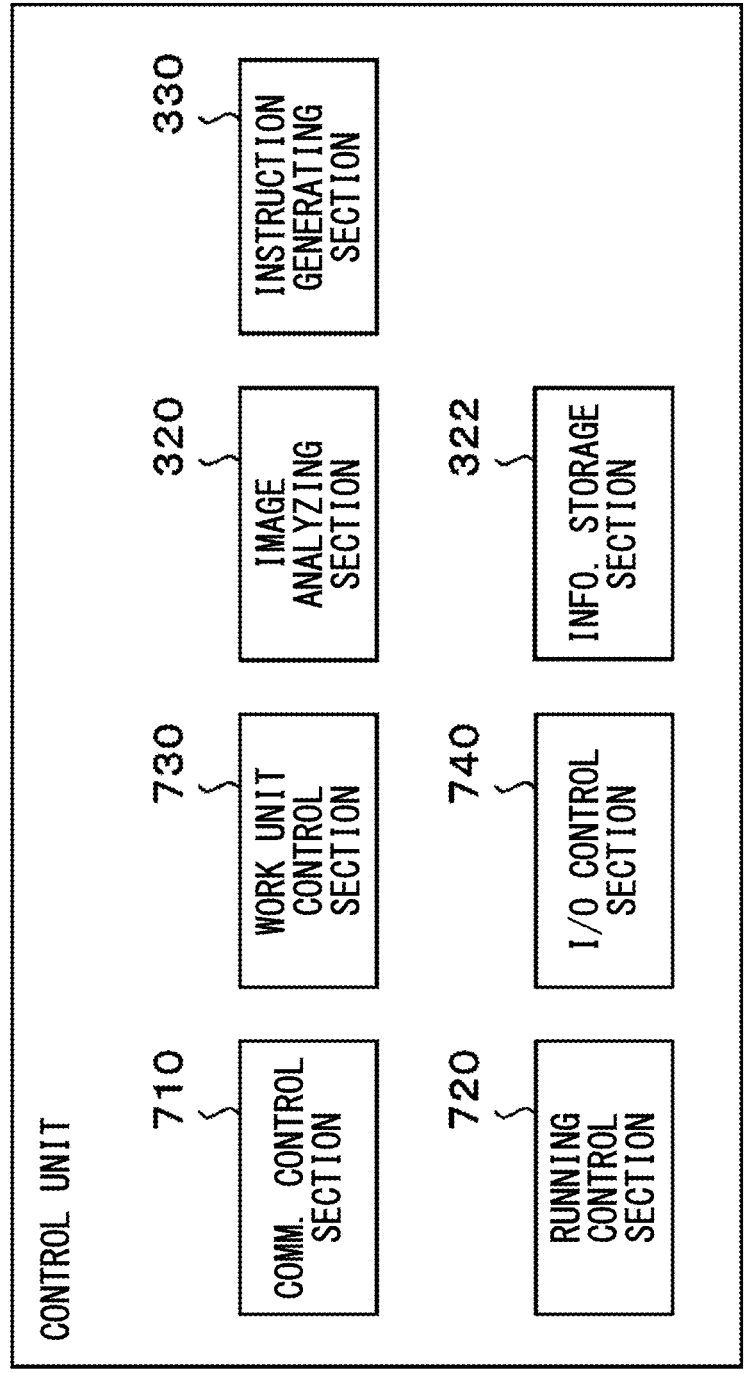
FIG. 8 schematically shows another example of the internal configuration of the control unit 680.

[Outline of Lawn Mower 230] The outline of the lawn mower 230 is explained using FIG. 6, FIG. 7 and FIG. 8. FIG. 6 schematically shows one example of the internal configuration of the lawn mower 230. In the present embodiment, the lawn mower 230 includes a housing 602. In the present embodiment, the lawn mower 230 includes, under the housing 602, a pair of front wheels 612 and a pair of rear wheels 614. The lawn mower 230 may include a pair of motors for run 616 that respectively drive the pair of rear wheels 614.

In the present embodiment, the lawn mower 230 includes a work unit 620. The work unit 620 for example has a blade disk 622, a cutter blade 624, a motor for work 626 and a shaft 628. The lawn mower 230 may include a position adjusting section 630 that adjusts a position of the work unit 620. The work unit 620 may be one example of a cutting section. The blade disk 622 and the cutter blade 624 may be one example of a rotor for cutting a work target.

The blade disk 622 is coupled with the motor for work 626 via the shaft 628. The cutter blade 624 may be a cutting blade for cutting lawn grasses. The cutter blade 624 is attached to the blade disk 622 and rotates together with the blade disk 622. The motor for work 626 rotates the blade disk 622.

In the present embodiment, inside the housing 602 or above the housing 602, the lawn mower 230 includes a battery unit 640, a user interface 650, an image-capturing unit 660, a sensor unit 670 and a control unit 680. The image-capturing unit 660 may be one example of an image-capturing section or image acquiring section. The control unit 680 may be one example of a judging section, information processing device or control device.

In the present embodiment, the battery unit 640 supplies electric power to each section of the lawn mower 230. In the present embodiment, the user interface 650 receives a user input. The user interface 650 outputs information to a user. Examples of the user interface 650 may include a keyboard, a pointing device, a microphone, a touch panel, a display, a speaker and the like.

In the present embodiment, the image-capturing unit 660 captures an image of the space around the lawn mower 230. The image-capturing unit 660 may capture an image of lawn grasses to be a work target of the lawn mower 230. The image-capturing unit 660 may capture an image of lawn grasses cut by the lawn mower 230. The image-capturing unit 660 may acquire a still image of an object or acquire a moving image of an object. The image-capturing unit 660 may have a plurality of image sensors. The image-capturing unit 660 may be a 360-degree angle camera.

In the present embodiment, the sensor unit 670 includes various types of sensors. The sensor unit 670 transmits outputs of various types of sensors to the control unit 680. Examples of the sensors may include a GPS signal receiver, a beacon receiver, a radio field intensity measuring machine, an acceleration sensor, an angular speed sensor, a wheel speed sensor, a contact sensor, a magnetic sensor, a temperature sensor, a humidity sensor, a soil water sensor and the like.

In the present embodiment, the control unit 680 controls operation of the lawn mower 230. According to one embodiment, the control unit 680 controls the pair of motors for run 616 to control travel of the lawn mower 230. According to another embodiment, the control unit 680 controls the motor for work 626 to control work of the lawn mower 230.

The control unit 680 may control the lawn mower 230 based on a result of a judgment process at the image analyzing section 320 of the managing server 210. For example, the control unit 680 controls the lawn mower 230 in accordance with an instruction generated by the instruction generating section 330 of the managing server 210.

In another embodiment, the control unit 680 may execute various types of judgment processes. The control unit 680 may execute at least one of judgment processes at the judgment processing section 440. In one embodiment, the control unit 680 may control the lawn mower 230 based on a result the above-mentioned judgment processes. For example, the control unit 680 judges the state of the work unit 620 based on image data of an image captured by the image-capturing unit 660. The state of the work unit 620 may be the cutting performance of the cutter blade 624.

In another embodiment, the control unit 680 may control the sprinkling device 240 based on a result of the above-mentioned judgment processes. For example, the control unit 680 recognizes the shapes of lawn grasses based on image data of an image captured by the image-capturing unit 660. The control unit 680 decides a water-supply parameter based on the shapes of lawn grasses. The control unit 680 transmits a water-supply parameter to the sprinkling device 240 to control the amount of water-supply to a particular position in the garden 30.

FIG. 7 schematically shows one example of the internal configuration of the control unit 680. In the present embodiment, the control unit 680 includes a communication control section 710, a running control section 720, a work unit control section 730 and an input-output control section 740. The communication control section 710 may be one example of a notifying section or image acquiring section. The running control section 720 may be one example of a travel control section. The work unit control section 730 may be one example of a work control section.

In the present embodiment, the communication control section 710 controls communication with an instrument located outside the lawn mower 230. The communication control section 710 may be a communication interface compatible with one or more communication systems. Examples of the instrument located outside may include the user terminal 20, the managing server 210, the sprinkling device 240 and the like. The communication control section 710 as necessary may acquire, from the monitoring camera 220, image data of an image captured by the monitoring camera 220.

In the present embodiment, the running control section 720 controls the motors for run 616 to control travel of the lawn mower 230. The running control section 720 controls autonomous run of the lawn mower 230. For example, the running control section 720 controls at least one of a travel speed, travel direction and travel route of the lawn mower 230.

The running control section 720 may control the motors for run 616 based on a result of judgment at the image analyzing section 320 of the managing server 210. In another embodiment, the running control section 720 may control the motors for run 616 based on a result of a judgment process at the control unit 680.

In the present embodiment, the work unit control section 730 controls the work unit 620. The work unit control section 730 may control at least one of the type of work, strength of work and schedule of work of the work unit 620. For example, the work unit control section 730 controls the motor for work 626 to control the strength of work of the work unit 620. The work unit control section 730 may control the position adjusting section 630 to control the strength of work of the work unit 620.

The work unit control section 730 may control at least either the motor for work 626 or the position adjusting section 630 based on a result of judgment at the image analyzing section 320 of the managing server 210. In another embodiment, the work unit control section 730 may control at least either the motor for work 626 or the position adjusting section 630 based on a result of a judgment process at the control unit 680. In still another embodiment, the work unit control section 730 may monitor an electric current value of the motor for work 626. The work unit control section 730 may transmit, to the image analyzing section 320, information indicating an electric current value of the motor for work 626.

In the present embodiment, the input-output control section 740 receives an input from at least one of the user interface 650, the image-capturing unit 660 and the sensor unit 670. The input-output control section 740 outputs information to the user interface 650. The input-output control section 740 may control at least one of the user interface 650, the image-capturing unit 660 and the sensor unit 670. For example, the input-output control section 740 controls at least one instrument among the user interface 650, the image-capturing unit 660 and the sensor unit 670 by adjusting setting of the instrument.

FIG. 8 schematically shows another example of the internal configuration of the control unit 680. It was explained using FIG. 7 that the managing server 210 has the image analyzing section 320, the information storage section 322 and the instruction generating section 330, and various types of judgment processes are executed at the managing server 210. In the embodiment of FIG. 7, the control unit 680 controls the lawn mower 230 based on a result of a judgment process at the image analyzing section 320.

The embodiment of the FIG. 8 is different from the embodiment of FIG. 7 in that the image analyzing section 320, the information storage section 322 and the instruction generating section 330 are disposed in the control unit 680. In the present embodiment, the running control section 720 and the work unit control section 730 control at least one of the motors for run 616, the motor for work 626 and the position adjusting section 630 based on an instruction generated by the instruction generating section 330. In other respects, it may have a configuration similar to the embodiment of FIG. 7.

In the present embodiment explained, the control unit 680 has the image analyzing section 320, the information storage section 322 and the instruction generating section 330. However, the control unit 680 is not limited to the present embodiment. In another embodiment, one or two among the image analyzing section 320, the information storage section 322 and the instruction generating section 330 may be disposed in the control unit 680, and the remaining sections may be disposed in the managing server 210. For example, the control unit 680 may not have the information storage section 322. In this case, the image analyzing section 320 disposed in the control unit 680 as necessary executes image analysis processing by accessing the information storage section 322 disposed in the managing server 210.

In still another embodiment, some configurations among a plurality of configurations included in the image analyzing section 320 may be disposed in the control unit 680 and the remaining configurations may be disposed in the managing server 210. For example, among a plurality of configurations included in the image analyzing section 320, the judgment processing section 440 is disposed in the control unit 680, and the learning processing section 410, the position calculating section 420 and the lawn recognizing section 430 are disposed in the managing server 210. Also, the parameter generating section 446 may be disposed in the control unit 680, and the remaining configurations of the image analyzing section 320 may be disposed in the managing server 210.

Figure 9:
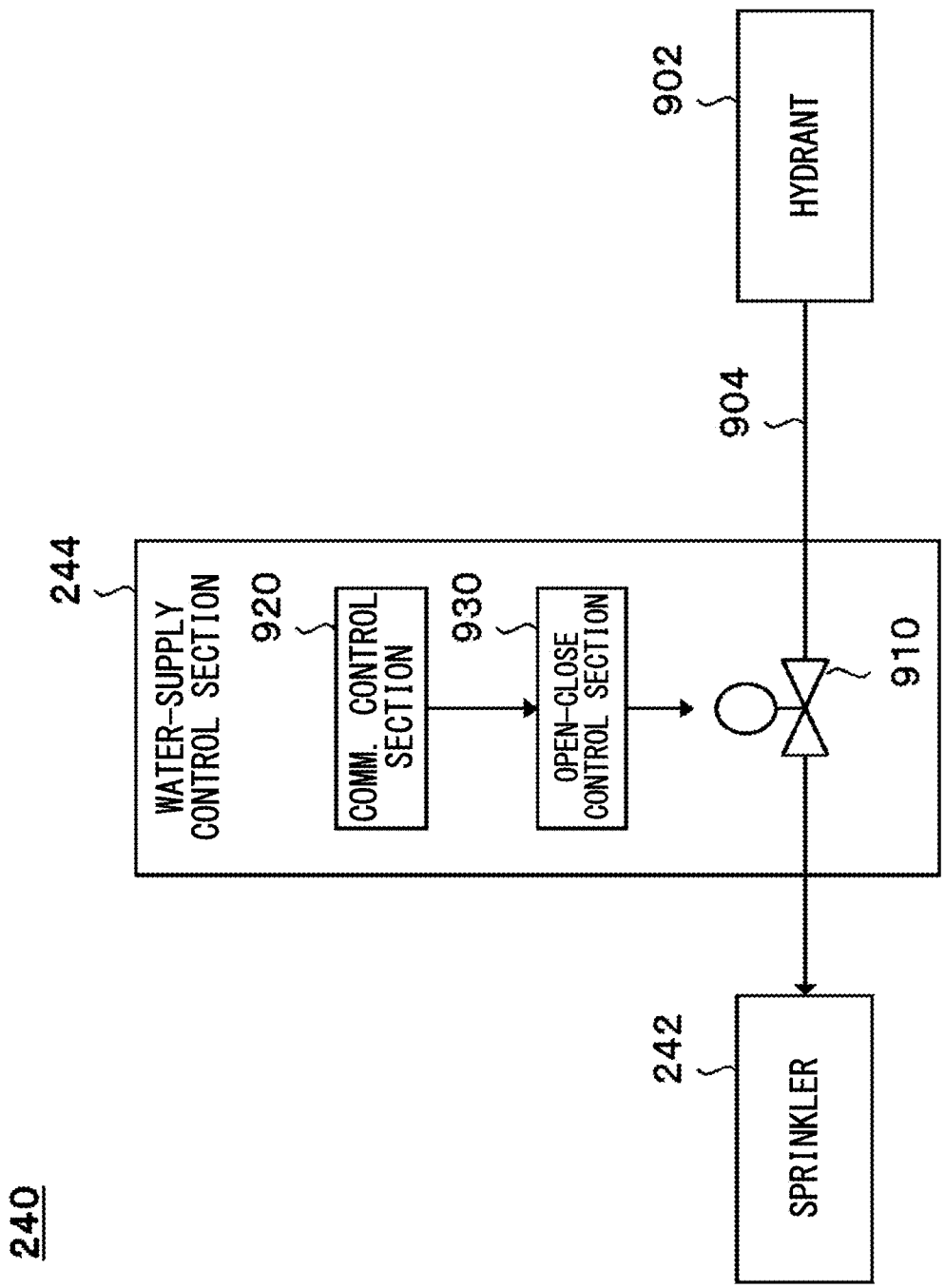
FIG. 9 schematically shows one example of the system configuration of a sprinkling device 240.

FIG. 9 schematically shows one example of the system configuration of the sprinkling device 240. In the present embodiment, the sprinkling device 240 includes the sprinkler 242 and the water-supply control section 244. The sprinkling device 240 may include a hydrant 902 and a water-supply line 904. The water-supply line 904 may be a pipe or water-supply facility that transfers water supplied from the hydrant 902 to the sprinkler 242. One end of the water-supply line 904 may be connected to the hydrant 902, and the other end of the water-supply line 904 may be connected to the sprinkler 242.

In the present embodiment, the water-supply control section 244 is disposed between the sprinkler 242 and the hydrant 902 in the water-supply line 904, and adjusts the amount of water-supply to the sprinkler 242. In the present embodiment, the water-supply control section 244 has an automatic valve 910, a communication control section 920 and an open-close control section 930.

In the present embodiment, the automatic valve 910 adjusts the amount of water to flow through the water-supply line 904. The automatic valve 910 may adjust the amount of water to flow through the water-supply line 904 based on a control signal from the open-close control section 930. The automatic valve 910 may be an electrically operated valve.

In the present embodiment, the communication control section 920 controls communication with the managing server 210 or the lawn mower 230. The communication control section 920 receives, from the managing server 210 or lawn mower 230, a water-supply parameter or water-supply instruction. The communication control section 920 transmits the water-supply parameter or water-supply instruction to the open-close control section 930. In the present embodiment, the open-close control section 930 controls operation of the automatic valve 910. For example, the open-close control section 930 controls operation of the automatic valve 910 based on a water-supply parameter or water-supply instruction.

Figure 10:
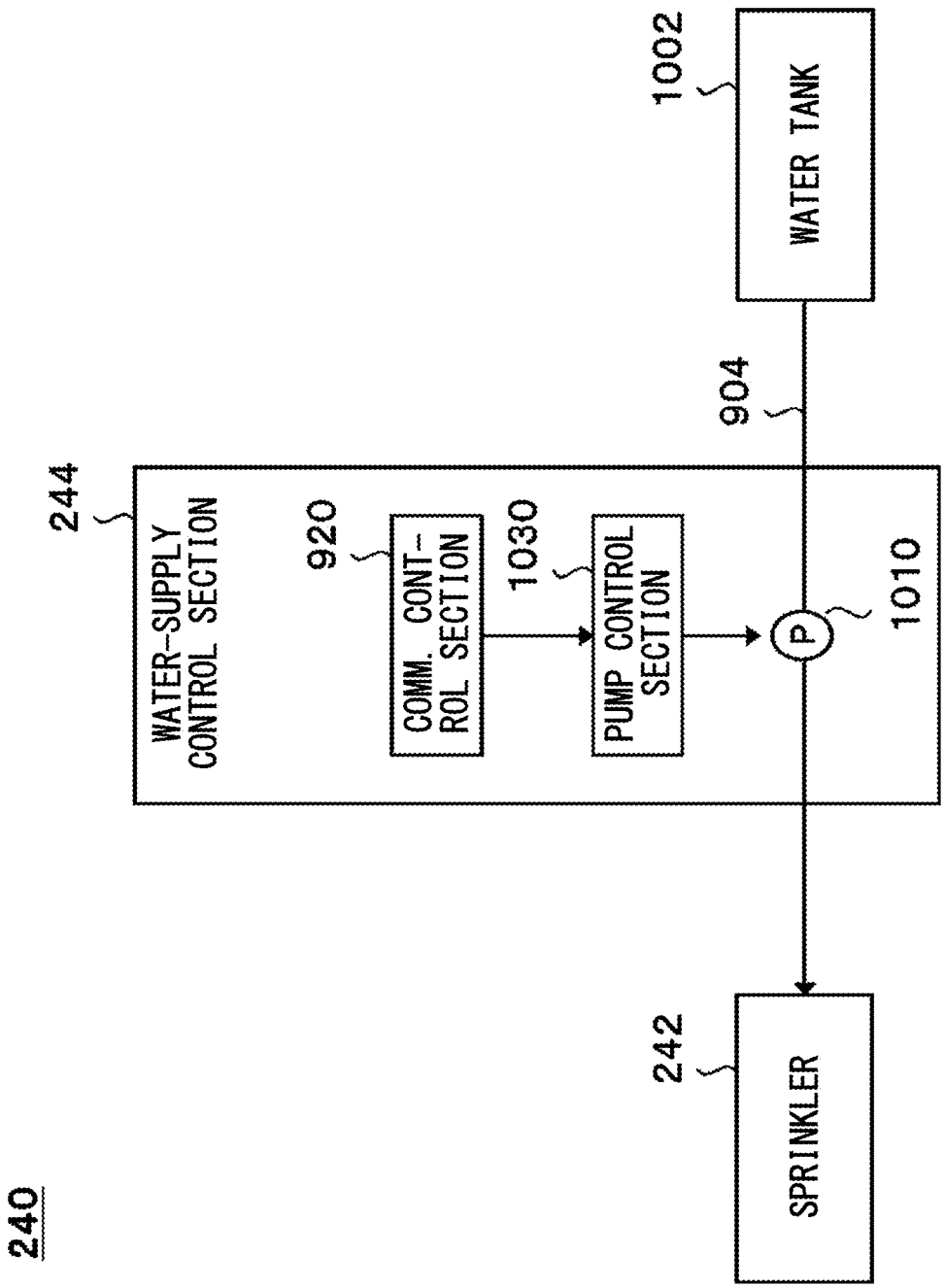
FIG. 10 schematically shows another example of the system configuration of the sprinkling device 240.

FIG. 10 schematically shows another example of the system configuration of the sprinkling device 240. In the present embodiment, the sprinkling device 240 includes the sprinkler 242 and the water-supply control section 244. The sprinkling device 240 may include the water-supply line 904 and a water tank 1002. In the present embodiment, the water-supply control section 244 has a pump 1010, the communication control section 920 and a pump control section 1030. The sprinkling device 240 may be mounted on the lawn mower 230.

In the present embodiment, one end of the water-supply line 904 is connected to the water tank 1002, and the other end of the water-supply line 904 is connected to the sprinkler 242. The pump 1010 transfers water inside the water tank 1002. The pump control section 1030 may adjust the amount of water to be transferred, based on a control signal from the pump control section 1030. The pump control section 1030 controls operation of the pump 1010. For example, the pump control section 1030 controls operation of the pump control section 1030 based on a water-supply parameter or water-supply instruction received by the communication control section 920.

Figure 11:
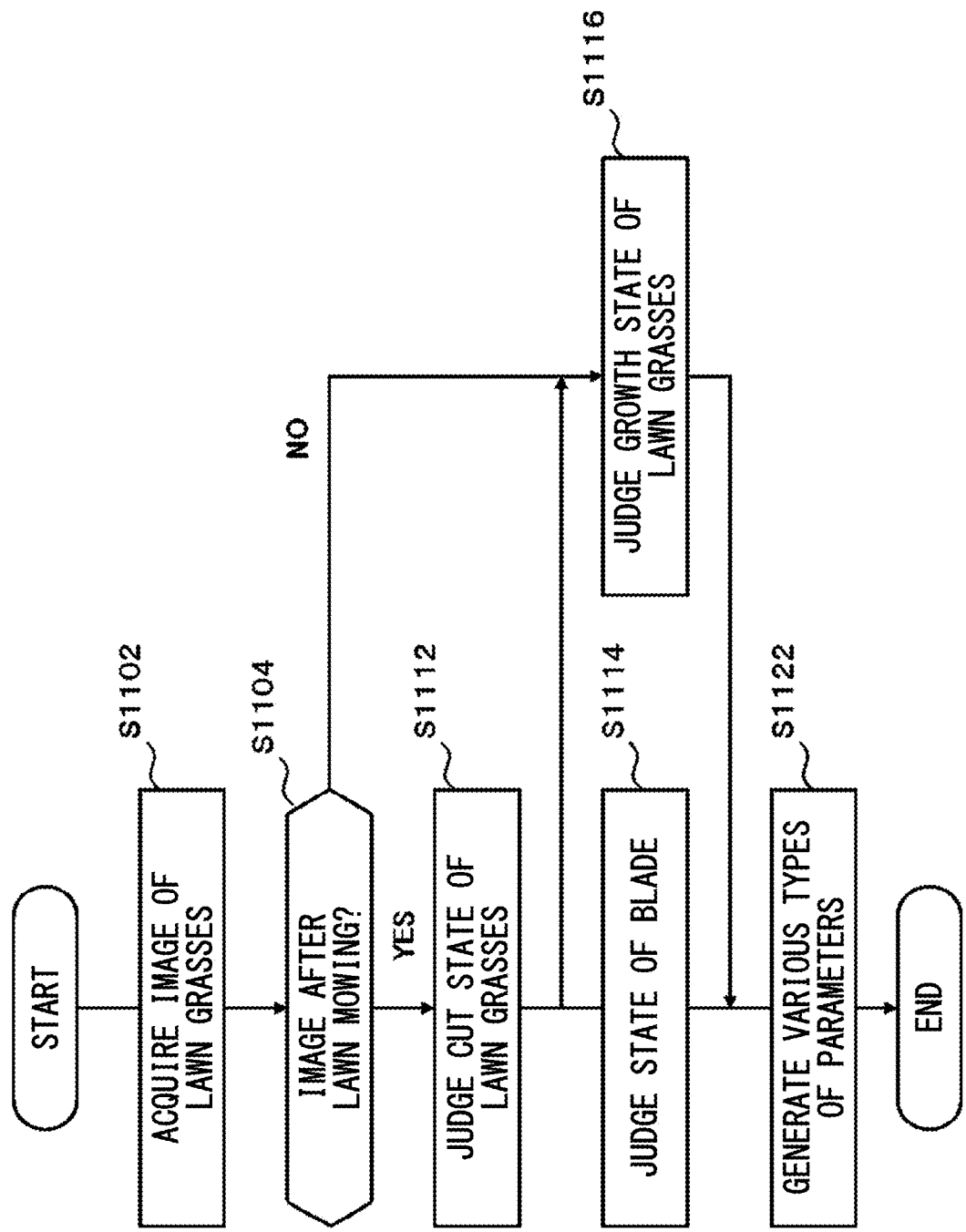
FIG. 11 schematically shows one example of information processing at the image analyzing section 320.

FIG. 11 schematically shows one example of information processing at the image analyzing section 320. According to the present embodiment, at Step 1102 (Step may be sometimes abbreviated to S), the lawn recognizing section 430 acquires, from the receiving section 310, image data of an image to be a target of analysis. At S1104, the lawn recognizing section 430 determines whether or not the image acquired from the receiving section 310 is an image after lawn mowing or an image before lawn mowing. For example, if the image acquired from the receiving section 310 is an image of lawn grasses present in the forward direction in terms of a course of the lawn mower 230, the lawn recognizing section 430 determines that the image is an image before lawn mowing. If the image acquired from the receiving section 310 is an image of lawn grasses present in a region that the lawn mower 230 passed through, the lawn recognizing section 430 determines that the image is an image after lawn mowing.

In one embodiment, the lawn recognizing section 430 may acquire information about at least either an installation position or an image-capturing condition of an image-capturing device that captured the image, and based on the information, determine whether the image acquired from the receiving section 310 is an image of lawn grasses present in the forward direction in terms of a course of the lawn mower 230 or an image of lawn grasses present in a region that the lawn mower 230 passed through. For example, if the image-capturing device is mounted at a front portion of the lawn mower 230, an image-capturing device is set to capture an image of the forward direction of the lawn mower 230, and so on, the lawn recognizing section 430 determines that an image acquired from the receiving section 310 is an image of lawn grasses present in the forward direction in terms of a course of the lawn mower 230.

In another embodiment, the lawn recognizing section 430 acquires, from the position calculating section 420, positional information indicating a position of lawn grasses in an image. The position calculating section 420 decides a position of lawn grasses in an image for example based on at least either an installation position or an image-capturing condition of an image-capturing device that captured the image. The lawn recognizing section 430 acquires information indicating the current position of the lawn mower 230. The lawn recognizing section 430 may determine whether an image acquired from the receiving section 310 is an image of lawn grasses present in the forward direction in terms of a course of the lawn mower 230 or an image of lawn grasses present in a region that the lawn mower 230 passed through, based on a position of the lawn grasses and a position of the lawn mower 230.

If it is determined that the image acquired from the receiving section 310 is an image after lawn mowing (if YES at S1104), at S1112, the lawn recognizing section 430 recognizes end portions of one or more lawn grasses present in the image. After recognizing the shape of at least one lawn grass, the lawn recognizing section 430 may recognize an end portion of the lawn grass based on the shape of the lawn grass. Also, the lawn state judging section 442 judges the cut state of the lawn grass based on a feature of the end portion of the lawn grass.

Next, at S1114, the lawn state judging section 442 transmits, to the blade state judging section 444, information indicating the cut state of the lawn grass. Then, the blade state judging section 444 judges the state of a blade based on the cut state of the lawn grass. Also, at S1116, the lawn state judging section 442 judges the growth state of the lawn grass based on a feature of the end portion of the lawn grass. In this case, the lawn recognizing section 430 may recognize the shape of lawn grass, and the lawn state judging section 442 may judge the growth state of the lawn grass based on the shape of the lawn grass.

Thereafter, at S1122, the parameter generating section 446 generates various types of parameters based on at least one of the cut state of the lawn grass, the growth state of the lawn grass and the state of a blade. In this case, the map generating section 448 may generate map information utilizing the parameters generated by the parameter generating section 446.

On the other hand, if it is determined that the image acquired from the receiving section 310 is an image before lawn mowing (if NO at S1104), at S1116, the lawn state judging section 442 judges the growth state of lawn grasses by a procedure similar to the above-mentioned one, and at S1122, the parameter generating section 446 generates various types of parameters by a procedure similar to the above-mentioned one. The map generating section 448 may generate map information utilizing parameters generated by the parameter generating section 446.

The various types of parameters generated at S1122 are transmitted to the instruction generating section 330. The various types of parameters may be transmitted to the instruction generating section 330 in a map information format. Thereby, processes at the image analyzing section 320 end. The image analyzing section 320 (i) may execute a series of processes every time it acquires image data from the receiving section 310 or (ii) may execute a series of processes for each subarea and for a predetermined number of pieces of image data.

FIG. 12 schematically shows one example of a data table 1200. The data table 1200 may be one example of a determination criterion for judging the type of lawn grasses. In the present embodiment, the data table 1200 utilizes a color of lawn grasses 1202 and a hardness of lawn grasses 1204 as factors to consider for judging the type of lawn grasses. The data table 1200 stores, in association with each other, a condition about the color of lawn grasses 1202 and a condition about the hardness of lawn grasses 1204, and a result of judgment 1206.

In the present embodiment, the condition about the color of lawn grasses 1202 is evaluated using evaluation categories consisting of four steps, "reddish brown", "yellowish green", "green" and "dark green". The color of lawn grasses may be evaluated based on an image to be a target of analysis by the image analyzing section 320. In the present embodiment, the condition about the hardness of lawn grasses 1204 is evaluated using evaluation categories consisting of three steps, "hard", "normal" and "soft". The hardness of lawn grasses 1204 may be evaluated for example based on an electric current value of the motor for work 626. Thresholds for classification into respective evaluation categories may be decided by a user or administrator, or may be decided through machine learning.

FIG. 13 schematically shows one example of a data table 1300. The data table 1300 may be one example of a determination criterion for deciding a determination criterion to be utilized in various types of judgment processes. In the present embodiment, the data table 1300 stores, in association with each other, a type of lawn grasses 1302, a determination criterion 1304 to be utilized in a process of judging the state of lawn grasses, and a determination criterion 1306 to be utilized in a process of judging the state of a blade.

FIG. 14 schematically shows one example of a data table 1400. The data table 1400 may be one example of a determination criterion to be utilized in a process of judging the state of lawn grasses. In the present embodiment, the data table 1400 utilizes, as factors to consider for judging the state of lawn grasses, shapes of cut portions 1402 and a color of cut portions 1404. The data table 1400 stores, in association with each other, a condition about the shapes of cut portions 1402 and a condition about a color of cut portions 1404, and a result of judgment 1406.

While the embodiments of the present invention have been described, the technical scope of the invention is not limited to the above described embodiments. It is apparent to persons skilled in the art that various alterations and improvements can be added to the above-described embodiments. Also, matters explained with reference to a particular embodiment can be applied to other embodiments as long as such application does not cause a technical contradiction. For example, matters explained about the embodiment of FIG. 1 can be applied to the embodiments of FIG. 2 to FIG. 14. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed at any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed at this order.

For example, the following matters are described in the present specification.

[Item A-1] A work machine having an autonomous travel function, comprising:
a cutting section that cuts a work target of the work machine;
an image-capturing section that captures an image of the work target cut by the cutting section; and
a judging section that judges a state of the cutting section based on the image captured by the image-capturing section.

[Item A-2] The work machine according to Item A-1, wherein the judging section judges whether maintenance of or a check on the cutting section is necessary or not based on a result of judgment about the state of the cutting section.

[Item A-3] The work machine according to Item A-1 or Item A-2, further comprising a specification information acquiring section that acquires specification information about a specification of the cutting section, wherein
the judging section judges the state of the cutting section based on the specification information acquired by the specification information acquiring section and the image captured by the image-capturing section.

[Item A-4] The work machine according to any one of Item A-1 to Item A-3, further comprising a notifying section that notifies a result of judgment by the judging section to a user of the work machine.

[Item A-5] The work machine according to any one of Item A-1 to Item A-4, further comprising a positional information acquiring section that acquires positional information indicating a position where the image-capturing section has captured the image, wherein
the judging section outputs, in association with each other, the positional information acquired by the positional information acquiring section and information indicating a result of judgment at the position indicated by the positional information.

[Item A-6] The work machine according to Item A-5, wherein if a result of judgment by the judging section satisfies a predetermined condition, the judging section outputs, in association with each other, the positional information acquired by the positional information acquiring section and information indicating a result of judgment by the judging section at the position indicated by the positional information.

[Item A-7] The work machine according to any one of Item A-1 to Item A-6, further comprising a travel control section that controls travel of the work machine based on a result of judgment by the judging section.

[Item A-8] The work machine according to any one of Item A-1 to Item A-7, further comprising a work control section that controls operation of the cutting section based on a result of judgment by the judging section.

[Item A-9] A control device that controls a work machine having an autonomous travel function, wherein
the work machine has:
a cutting section that cuts a work target of the work machine; and
an image-capturing section that captures an image of the work target cut by the cutting section, and
the control device comprises:
a judging section that judges a state of the cutting section based on the image captured by the image-capturing section; and
a control section that controls the work machine based on a result of judgment by the judging section.

[Item A-10] A control program for controlling a work machine having an autonomous travel function, wherein
the work machine has:
a cutting section that cuts a work target of the work machine; and
an image-capturing section that captures an image of the work target cut by the cutting section, and
the control program is a program for causing a computer to execute:
a judgment procedure of judging a state of the cutting section based on the image captured by the image-capturing section; and
a control procedure of controlling the work machine based on a result of judgment by in judgment procedure.

[Item A-11] The control program according to Item A-10, wherein
the work machine further has a processor, and
the computer is the processor of the work machine.

[Item B-1] An information processing device comprising:
an image acquiring section that acquires image data of an image of a plant;
a form recognizing section that recognizes at least either (i) a shape of the plant or (ii) an end portion of the plant, based on the image data acquired by the image acquiring section; and
a deciding section that decides at least one of (a) a level of water content in a medium of the plant, (b) whether water-supply to the plant is necessary or not, and (c) an amount of water-supply to the plant, based on a feature of at least either the shape of the plant or the end portion of the plant that is recognized by the form recognizing section.

[Item B-2] The information processing device according to Item B-1, wherein
the deciding section:
recognizes a feature of at least either the shape of the plant or the end portion of the plant, based on a result of recognition by the form recognizing section; and
decides at least one of (a) the level of water content in the medium of the plant, (b) whether water-supply to the plant is necessary or not, and (c) the amount of water-supply to the plant, based on the feature recognized by the feature recognizing section.

[Item B-3] The information processing device according to Item B-2, further comprising:
a positional information acquiring section that acquires positional information indicating a position where the image has been captured; and
a form information storage section that stores, in association with each other, (i) the positional information acquired by the positional information acquiring section, and (ii) information about at least either the shape of the plant or the end portion of the plant recognized by the form recognizing section, wherein the deciding section recognizes a feature of at least either the shape of the plant or the end portion of the plant, utilizing, as learning data, information stored in the form information storage section.

[Item B-4] The information processing device according to Item B-1 or Item B-2, further comprising a positional information acquiring section that acquires positional information indicating a position where the image has been captured, wherein the deciding section outputs, in association with each other, the positional information acquired by the positional information acquiring section and at least one of (a) the level of water content in the medium of the plant, (b) whether water-supply to the plant is necessary or not, and (c) the amount of water-supply to the plant at the position indicated by the positional information.

[Item B-5] The information processing device according to Item B-4, wherein if at least one of (a) the level of water content in the medium of the plant, (b) whether water-supply to the plant is necessary or not, and (c) the amount of water-supply to the plant satisfies a predetermined condition, the deciding section outputs, in association with each other, the positional information acquired by the positional information acquiring section and at least one of (a) the level of water content in the medium of the plant, (b) whether water-supply to the plant is necessary or not, and (c) the amount of water-supply to the plant at the position indicated by the positional information.

[Item B-6] The information processing device according to any one of Item B-1 to Item B-5, wherein the deciding section decides at least either (i) whether water-supply to the plant is necessary or not or (ii) the amount of water-supply, based on the level of water content in the medium of the plant.

[Item B-7] A water-supply system comprising:

the information processing device according to Item B-6; and a water-supply section that supplies water to the plant based on a decision by the deciding section.

[Item B-8] The water-supply system according to Item B-7, further comprising a work machine having an autonomous travel function, wherein the work machine has an image-capturing section that captures an image of the plant, and an image acquiring section of the information processing device acquires image data of the image of the plant captured by the image-capturing section of the work machine.

[Item B-9] The water-supply system according to Item B-7, further comprising a work machine having an autonomous travel function, wherein the water-supply section is disposed in the work machine.

[Item B-10] The water-supply system according to Item B-7, further comprising a work machine having an autonomous travel function, wherein the work machine has a cutting section that cuts the plant, and the deciding section of the information processing device decides at least one of (a) the level of water content in the medium of the plant, (b) whether water-supply to the plant is necessary or not, and (c) the amount of water-supply to the plant, based on a feature of a cut portion of the plant cut by the cutting section.

[Item B-11] An information processing system comprising:

the information processing device according to any one of Item B-1 to Item B-6; and a work machine having an autonomous travel function, wherein the work machine has an image-capturing section that captures an image of the plant, and an image acquiring section of the information processing device acquires image data of the image of the plant captured by the image-capturing section of the work machine.

[Item B-12] An information processing system comprising:

the information processing device according to any one of Item B-1 to Item B-6; and a work machine having an autonomous travel function, wherein the work machine has a cutting section that cuts the plant, and the deciding section of the information processing device decides at least one of (a) the level of water content in the medium of the plant, (b) whether water-supply to the plant is necessary or not, and (c) the amount of water-supply to the plant, based on a feature of a cut portion of the plant cut by the cutting section.

[Item B-13] A program for causing a computer to function as the information processing device according to any one of Item B-1 to Item B-6.

[Item C-1] A control device that controls a work machine having an autonomous travel function, the control device comprising:

an image acquiring section that acquires image data of an image of a work target of the work machine;

a feature recognizing section that recognizes a feature about at least one of (i) a type of the work target of the work machine, (ii) a number or density of the work target, (iii) a shape of the work target and (iv) an appearance of the work target after work, based on the image data acquired by the image acquiring section; and a control parameter deciding section that decides at least either (i) a parameter for controlling travel of the work machine or (ii) a parameter for controlling work of the work machine, based on the feature recognized by the feature recognizing section.

[Item C-2] The control device according to Item C-1, further comprising a transmitting section that transmits, to the work machine, the parameter decided by the control parameter deciding section.

[Item C-3] The control device according to Item C-1 or Item C-2, wherein the work machine has a cutting section that cuts the work target, the feature recognizing section recognizes a feature of a cut portion of the work target cut by the cutting section, and the control device further comprises a judging section that judges a state of the cutting section based on the feature of the cut portion of the work target recognized by the feature recognizing section.

[Item C-4] The control device according to Item C-3, wherein the control parameter deciding section decides the parameter based on a result of judgment by the judging section.

[Item C-5] The control device according to Item C-3 or Item C-4, wherein the cutting section has a rotor for cutting the work target, the judging section judges a cutting performance of the cutting section, and if the cutting performance of the cutting section judged by the judging section does not satisfy a predetermined condition, the control parameter deciding section decides the parameter such that (i) a travel speed of the work machine becomes lower or (ii) a rotational speed of the rotor becomes higher, as compared with a case where the cutting performance of the cutting section satisfies the predetermined condition.

[Item C-6] The control device any one of Item C-1 to Item C-5, wherein the work machine has an image-capturing section that captures an image of the work target, and the image acquiring section acquires image data of the image of the work target captured by the image-capturing section of the work machine.

[Item C-7] A work machine having an autonomous travel function, the work machine comprising;

the control device according to any one of Item C-1 to Item C-5; and an image-capturing section that captures an image of the work target, wherein the image acquiring section of the control device acquires image data of the image of the work target captured by the image-capturing section of the work machine. [Item C-8] A program for causing a computer to function as the control device according to any one of Item C-1 to Item C-6.

What is claimed is:

1. A water-supply system comprising:
   an image acquiring section that acquires image data of an image of a plant;
   a form recognizing section that recognizes at least either (i) a shape of the plant or (ii) an end portion of the plant, based on the image data acquired by the image acquiring section;
   a deciding section that decides at least one of (a) a level of water content in a medium of the plant, (b) whether water-supply to the plant is necessary or not, and (c) an amount of water-supply to the plant, based on a feature of at least either the shape of the plant or the end portion of the plant that is recognized by the form recognizing section; and
   a water-supply section that supplies water to the plant based on a decision by the deciding section.

2. The water-supply system according to claim 1, wherein the deciding section:
   recognizes a feature of at least either the shape of the plant or the end portion of the plant, based on a result of recognition by the form recognizing section; and
   decides at least one of (a) the level of water content in the medium of the plant, (b) whether water-supply to the plant is necessary or not, and (c) the amount of water-supply to the plant, based on the recognized feature.

3. The water-supply system according to claim 2, further comprising:
   a positional information acquiring section that acquires positional information indicating a position where the image has been captured; and
   a form information storage section that stores, in association with each other, (i) the positional information acquired by the positional information acquiring section, and (ii) information about at least either the shape of the plant or the end portion of the plant recognized by the form recognizing section, wherein
   the deciding section recognizes a feature of at least either the shape of the plant or the end portion of the plant, utilizing, as learning data, information stored in the form information storage section.

4. The water-supply system according to claim 1, further comprising a positional information acquiring section that acquires positional information indicating a position where the image has been captured, wherein
   the deciding section outputs, in association with each other, the positional information acquired by the positional information acquiring section and at least one of (a) the level of water content in the medium of the plant, (b) Whether water-supply to the plant is necessary or not, and (c) the amount of water-supply to the plant at the position indicated by the positional information.

5. The water-supply system according to claim 4, wherein if at least one of (a) the level of water content in the medium of the plant, (b) whether water-supply to the plant is necessary or not, and (c) the amount of water-supply to the plant satisfies a predetermined condition, the deciding section outputs, in association with each other, the positional information acquired by the positional information acquiring section and at least one of (a) the level of water content in the medium of the plant, (b) whether water-supply to the plant is necessary or not, and (c) the amount of water-supply to the plant at the position indicated by the positional information.

6. The water-supply system according to of claim 1, wherein the deciding section decides at least either (i) whether water-supply to the plant is necessary or not or (ii) the amount of water-supply, based on the level of water content in the medium of the plant.

7. The water-supply system according to claim 1, further comprising a work machine having an autonomous travel function, wherein
   the work machine has an image-capturing section that captures an image of the plant, and
   an image acquiring section of the information processing device acquires image data of the image of the plant captured by the image-capturing section of the work machine.

8. The water-supply system according to claim 1, further comprising a work machine having an autonomous travel function, wherein
   the water-supply section is disposed in the work machine.

9. The water-supply system according to claim 1, further comprising a work machine having an autonomous travel function, wherein
   the work machine has a cutting section that cuts the plant, and
   the deciding section of the information processing device decides at least one of (a) the level of water content in the medium of the plant, (b) whether water-supply to the plant is necessary or not, and (c) the amount of water-supply to the plant, based on a feature of a cut portion of the plant cut by the cutting section.

10. A non-transitory computer readable medium storing thereon a program for causing a computer to perform operations comprising:
    acquiring image data of an image of a plant;
    recognizing at least either (i) a shape of the plant or (ii) an end portion of the plant, based on the image data acquired by the image acquiring;
    deciding at least one of (a) a level of water content in a medium of the plant, (b) whether water-supply to the plant is necessary or not, and (c) an amount of water-supply to the plant, based on a feature of at least either the shape of the plant or the end portion of the plant that is recognized by the recognizing; and
    operating a water-supply section that supplies water to the plant based on a decision by the deciding section.

11. The water-supply system according to claim 1, wherein the form recognizing section recognizes at least the end portion of the plant, and wherein the deciding section of the information processing device decides at least one of (a) a level of water content in the medium of the plant, (b) whether water-supply to the plant is necessary or not, and (c) an amount of water-supply to the plant, based on a feature of the end portion of the plant.

12. The water-supply system according to claim 11, wherein the feature of the end portion of the plant comprises one or more features selected from the group consisting of shape of the end portion, color of the end portion; luster of the end portion; variation in color between the end portion and other portions of the plant, variation in thicknesses between the end portion and other portions of the plant, irregularity of a cut surface of the end portion of the plant, hue of the cut surface of the end portion of the plant, luster of the cut surface of the end portion of the plant, and amount of liquid droplets at the cut surface of the end portion of the plant.

13. The non-transitory computer readable medium according to claim 10, wherein the step of recognizing comprises recognizing at least the end portion of the plant, and wherein the step of deciding comprises deciding at least one of (a) a level of water content in the medium of the plant, (b) whether water-supply to the plant is necessary or not, and (c) an amount of water-supply to the plant, based on a feature of the end portion of the plant.

14. The non-transitory computer readable medium according to claim 13, wherein the feature of the end portion of the plant comprises one or more features selected from the group consisting of shape of the end portion, color of the end portion; luster of the end portion; variation in color between the end portion and other portions of the plant, variation in thicknesses between the end portion and other portions of the plant, irregularity of a cut surface of the end portion of the plant, hue of the cut surface of the end portion of the plant, luster of the cut surface of the end portion of the plant, and amount of liquid droplets at the cut surface of the end portion of the plant.

15. A water-supply system comprising:
- an image acquiring section that acquires image data of an image of a plant;
- a form recognizing section that recognizes a cut portion of the plant, based on the image data acquired by the image acquiring section;
- a deciding section that decides at least one of (a) a level of water content in a medium of the plant, (b) whether water-supply to the plant is necessary or not, and (c) an amount of water-supply to the plant, based on a feature of the cut portion of the plant that is recognized by the form recognizing section; and
- a water-supply section that supplies water to the plant based on a decision by the deciding section.

16. The water-supply system according to claim 15, wherein the feature of the cut portion of the plant comprises one or more features selected from the group consisting of thicknesses of the cut portion of the plant, irregularity of a cut surface of the cut portion of the plant, hue of the cut surface of the cut portion of the plant, luster of the cut surface of the cut portion of the plant, and amount of liquid droplets at the cut surface of the cut portion of the plant.

17. The water-supply system according to claim 1, wherein the water-supply section comprises at least one device for supplying water to plants.

* * * * *